US010928875B2

(12) United States Patent
Jung et al.

(10) Patent No.: US 10,928,875 B2
(45) Date of Patent: Feb. 23, 2021

(54) CHARGE CONTROL METHOD AND ELECTRONIC DEVICE BASED ON VOLTAGE OF BATTERY

(71) Applicant: Samsung Electronics Co., Ltd., Gyeonggi-do (KR)

(72) Inventors: Ku-Chul Jung, Gyeonggi-do (KR); Chui-Woo Park, Gyeonggi-do (KR); Sang-Hyun Ryu, Gyeonggi-do (KR); Min-Jung Park, Gyeonggi-do (KR); Jeong-Ho Lee, Gyeonggi-do (KR); Chi-Hyun Cho, Gyeonggi-do (KR)

(73) Assignee: Samsung Electronics Co., Ltd

( * ) Notice: Subject to any disclaimer, the term of this patent is extended or adjusted under 35 U.S.C. 154(b) by 123 days.

(21) Appl. No.: 15/920,978

(22) Filed: Mar. 14, 2018

(65) Prior Publication Data
US 2018/0267586 A1 Sep. 20, 2018

(30) Foreign Application Priority Data
Mar. 14, 2017 (KR) .................. 10-2017-0032001

(51) Int. Cl.
*G06F 1/26* (2006.01)
*H02J 7/00* (2006.01)

(52) U.S. Cl.
CPC ............. *G06F 1/263* (2013.01); *H02J 7/008* (2013.01); *H02J 7/0047* (2013.01); *H02J 7/0069* (2020.01); *H02J 7/0071* (2020.01); *H02J 7/0068* (2013.01)

(58) Field of Classification Search
CPC .................................. H02J 7/008; G06F 1/26
See application file for complete search history.

(56) References Cited

U.S. PATENT DOCUMENTS

| 5,677,077 A | 10/1997 | Faulk |
| 7,679,588 B2 | 3/2010 | Kim et al. |
| 8,421,418 B2 | 4/2013 | Kumashiro et al. |

(Continued)

FOREIGN PATENT DOCUMENTS

| EP | 2 779 356 | 9/2014 |
| JP | 2007060782 | 3/2007 |
| KR | 2015/0098849 | 8/2015 |

OTHER PUBLICATIONS

European Search Report dated Jul. 12, 2018 issued in counterpart application No. 18161561.8-1202, 9 pages.

*Primary Examiner* — Kim Huynh
*Assistant Examiner* — Joshua Neveln
(74) *Attorney, Agent, or Firm* — The Farrell Law Firm, P.C.

(57) ABSTRACT

Disclosed is an electronic device including a battery; an interface that receives an external power; a system circuit including a processor; and a power management circuit, wherein the power management circuit is configured to detect an input of the external power through the interface; identify a voltage of the battery in response to the detection of the input of the external power; when the voltage of the battery belongs to a first designated voltage range, avoid charging the battery using the input external power and supply the input external power to the system circuit; and when the voltage of the battery belongs to a second designated voltage range, charge the battery using at least some of the input external power.

16 Claims, 12 Drawing Sheets

(56) References Cited

U.S. PATENT DOCUMENTS

| | | |
|---|---|---|
| 8,612,073 B2 | 12/2013 | Fuji et al. |
| 2010/0188238 A1* | 7/2010 | Yasuda .................... H02J 5/00 |
| | | 340/636.1 |
| 2013/0207618 A1* | 8/2013 | Renken ................ H02J 7/0086 |
| | | 320/155 |
| 2015/0188326 A1 | 7/2015 | Choi et al. |
| 2016/0218539 A1* | 7/2016 | Herrmann ............... H02J 7/008 |
| 2016/0344206 A1 | 11/2016 | Ono |

\* cited by examiner

CHARGE CONTROL METHOD AND ELECTRONIC DEVICE BASED ON VOLTAGE OF BATTERY

PRIORITY

This application claims priority under 35 U.S.C. § 119(a) to Korean Patent Application Serial No. 10-2017-0032001 filed in the Korean Intellectual Property Office on Mar. 14, 2017, the disclosure of which is incorporated herein by reference.

BACKGROUND

1. Field of the Disclosure

The present disclosure relates generally to an electronic device and a charging method of a battery connected to the electronic device.

2. Description of the Related Art

Recently, the use of an electronic device that can be easily carried, such as a smart phone, a tablet personal computer (PC), or a wearable device, has been increased. Further, the electronic device may be configured to perform various functions, such as voice communication, internet searching, taking photos or videos, playing music, or watching videos. For an electronic device that can be easily carried, power is supplied to the electronic device by a battery. Further, as various functions are performed by the electronic device, the power consumption of the battery increases.

According to the increase in power consumption, the capacity of a battery connected to an electronic device is being increased to improve the time for which the electronic device can be used. Further, in order to charge a battery of an electronic device, chargers, such as a travel adaptor (TA) that charges a battery through a USB cable, may be used.

A battery connected to an electronic device may be over discharged according to the use of the electronic device or the characteristic of the battery. When current used during normal charging, rather than a low current, is applied to an overly discharged battery, the battery is under a lot of stress, and an accumulation of the stress may damage the battery. Therefore, when a battery is charged, it is necessary to identify whether the battery is in an over discharged state, and when the battery is in an over discharged state, prevent the battery from being damaged due to the over discharged state.

SUMMARY

The present disclosure has been made to address at least the above problems and/or disadvantages and to provide at least the advantages described below.

According to an aspect of the present disclosure, an electronic device may include a battery; an interface that receives an external power; a system circuit including a processor; and a power management circuit, wherein the power management circuit may be configured to: detect an input of the external power through the interface; identify a voltage of the battery in response to the detection of the input of the external power; when the voltage of the battery belongs to a first designated voltage range, avoid charging the battery using the input external power and supply the input external power to the system circuit; and when the voltage of the battery belongs to a second designated voltage range, charge the battery using at least some of the input external power.

According to another aspect of the present disclosure, a method for controlling charging of a battery in an electronic device, the method may include detecting an input of an external power; identifying a voltage of the battery in response to the detection of the input of the external power; supplying the input external power to a system circuit of the electronic device while avoiding charging the battery using the input external power when the voltage of the battery belongs to a first designated range; and charging the battery using at least some of the input external power when the voltage of the battery belongs to a second designated voltage range.

In accordance with an aspect of the present disclosure, a non-transitory computer-readable recording medium is provided, in which a program to be performed in a computer is recorded, wherein the program comprises an executable instruction allowing a processor to, when the program is performed by the processor detect an input of an external power; identify a voltage of the battery in response to the detection of the input of the external power; supply the input external power to a system circuit of the electronic device while avoiding charging the battery using the input external power when the voltage of the battery belongs to a first designated voltage range; and charge the battery using at least some of the input external power when the voltage of the battery belongs to a second designated voltage range.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
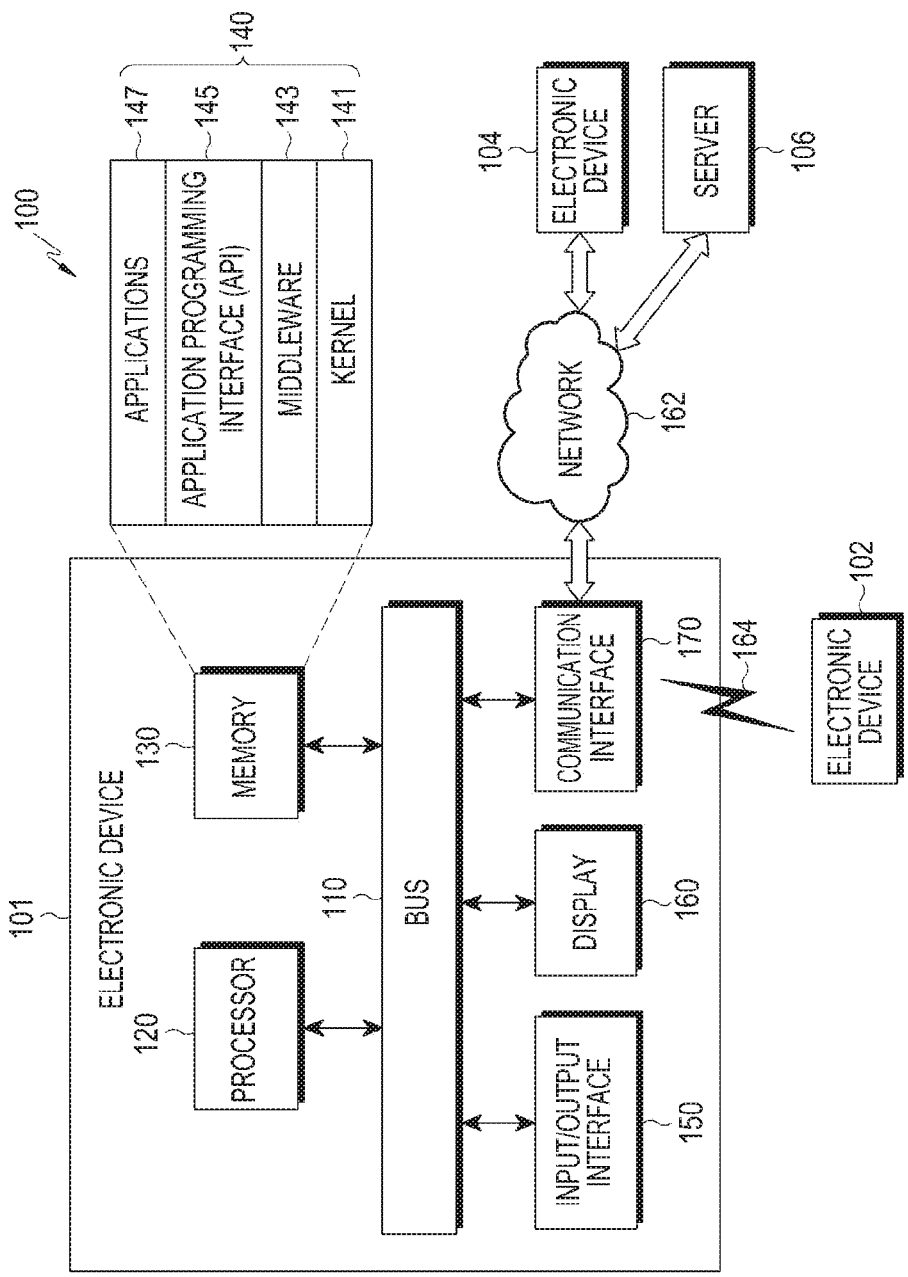
FIG. 1 illustrates a network environment including an electronic device, according to an embodiment of the present disclosure.

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

In this disclosure, a singular expression may include a plural expression unless they are definitely different in context.

In the present disclosure, the expressions "A or B" or "at least one of A and/or B" may include all possible combinations of the items listed. Further, the expressions "a first", "a second", "the first", or "the second" may modify the corresponding elements regardless of importance, and may be used to distinguish an element from another element, but do not limit the corresponding elements.

When an element (e.g., a first element) is referred to as being "communicatively coupled", "functionally coupled" or "connected" to another element (e.g., a second element), the element (e.g., the first element) may be connected directly to the another element (e.g., the second element), or may be connected to the another element (e.g., the second element) through yet another element (e.g., a third element).

The expression "configured to" in the present disclosure may be interchangeably used with, for example, "suitable for", "having the capacity to", "adapted to", "made to", "capable of", or "designed to" in terms of hardware or software, depending on circumstances. Alternatively, in some situations, the expressions "device configured to" or "device adapted to" may mean that the device, together with other devices or components, "is able to". For example, the expression "processor configured to perform A, B, and C" may mean a dedicated processor (e.g. an embedded processor) only for performing the corresponding operations or a general-purpose processor (e.g., a central processing unit (CPU) or application processor (AP)) that can perform A, B, and C by executing one or more software programs stored in a memory device.

The term "module" may include a unit consisting of hardware, software, or firmware, and may be used interchangeably with the term "logic", "logical block", "component", or "circuit". The module may be an integrated component, or a minimum unit for performing one or more functions or a part thereof. The module may be mechanically or electronically implemented and may include, an application-specific integrated circuit (ASIC) chip, a field-programmable gate arrays (FPGA), or a programmable-logic device, which has been known or will be developed in the future, for performing certain operations.

An electronic device according to various embodiments of the present disclosure may include at least one of, for example, a smart phone, a tablet PC, a mobile phone, a video phone, an electronic book reader (e-book reader), a desktop PC, a laptop PC, a netbook computer, a workstation, a server, a personal digital assistant (PDA), a portable multimedia player (PMP), an MPEG-1 audio layer-3 (MP3) player, a mobile medical device, a camera, and a wearable device. The wearable device may include at least one of an accessory type device (e.g., a watch, a ring, a bracelet, an anklet, a necklace, a pair of glasses, a contact lens, or a head-mounted device (HMD)), a fabric or clothing integrated type device (e.g., a piece of electronic clothing), a body-mounted type device (e.g., a skin pad or tattoo), and a bio-implantable type device (e.g., an implantable circuit).

The electronic device may include at least one of, for example, a television, a digital video disk (DVD) player, an audio player, a refrigerator, an air conditioner, a vacuum cleaner, an oven, a microwave oven, a washing machine, an air cleaner, a set-top box, a home automation control panel, a security control panel, a media box (e.g., Samsung HomeSync™, Apple TV™, or Google TV™), a game console (e.g., Xbox™ or PlayStation™), an electronic dictionary, an electronic key, a camcorder, and an electronic photo frame.

The electronic device may further include at least one of various medical devices (e.g., various portable medical measuring devices (a blood glucose monitoring device, a heart rate monitoring device, a blood pressure measuring device, or a body temperature measuring device), a magnetic resonance angiography (MRA) device, a magnetic resonance imaging (MRI) device, a computed tomography (CT) machine, and an ultrasonic machine), a navigation device, a global navigation satellite system (GNSS) device, an event data recorder (EDR), a flight data recorder (FDR), a vehicle infotainment device, an electronic device for a ship (e.g., a navigation device for a ship or a gyro-compass), an avionics devices, security devices, an automotive head unit, a robot for home or business, a drone, an automated teller machine (ATM), a point of sales (POS) terminal, or an Internet of things (IoT) device (e.g., a light bulb, various sensors, a sprinkler device, a fire alarm, a thermostat, a streetlamp, a toaster, sporting goods, a hot water tank, a heater, or a boiler).

An electronic device may additionally include at least one of a part of furniture, a building/structure, a vehicle, an electronic board, an electronic signature receiving device, a projector, and various types of measuring instruments (e.g., a water meter, an electric meter, a gas meter, and a radio wave meter). The electronic device may be flexible, or may be a combination of two or more of the aforementioned devices. The electronic device is not limited to the above described devices. In the present disclosure, the term "user" may indicate a person using an electronic device or a device (e.g., an artificial intelligence electronic device) using an electronic device.

Referring to FIG. 1, an electronic device 101 within a network environment 100, according to an embodiment of the present disclosure, will be described.

The electronic device 101 includes a bus 110, a processor 120, a memory 130, an input/output interface 150, a display 160, and a communication interface 170. The electronic device 101 may omit at least one of the elements, or may further include other elements. The bus 110 may include, for example, a circuit that interconnects the elements 110 to 170 and transmits communication (e.g., control messages or data) between the elements. The processor 120 may include one or more of a CPU, an AP, and a communication processor (CP). The processor 120 may carry out operations or data processing relating to the control and/or communication of at least one other element of the electronic device 101.

The memory 130 may include a volatile and/or non-volatile memory. The memory 130 may store instructions or data relevant to at least one other element of the electronic device 101. The memory 130 may store software and/or a program 140. The program 140 may include a kernel 141, middleware 143, an application programming interface (API) 145, and/or application programs (or applications) 147. At least a portion of the kernel 141, the middleware 143, and the API 145 may be referred to as an operating system (OS). The kernel 141 may control or manage system resources (e.g., the bus 110, the processor 120, or the memory 130) used for executing an operation or function implemented by other programs (e.g., the middleware 143, the API 145, or the application programs 147). Furthermore, the kernel 141 may provide an interface through which the middleware 143, the API 145, or the application programs 147 may access the individual elements of the electronic device 101 to control or manage the system resources.

The middleware 143 may function as an intermediary for allowing the API 145 or the application programs 147 to communicate with the kernel 141 to exchange data. Furthermore, the middleware 143 may process one or more task requests, which are received from the application programs 147, according to priorities thereof. The middleware 143 may assign priorities for using system resources (e.g., the bus 110, the processor 120, or the memory 130) of the electronic device 101 to one or more of the application programs 147, and may process the one or more task requests. The API 145 is an interface through which the applications 147 control functions provided from the kernel 141 or the middleware 143, and may include, for example, at least one interface or function (e.g., an instruction) for file control, window control, image processing, or text control. The input/output interface 150 may forward instructions or data, input from a user or another external device, to the other element(s) of the electronic device 101, or may output instructions or data, received from the other element(s) of the electronic device 101, to the user or the another external device.

The display 160 may include a liquid crystal display (LCD), a light emitting diode (LED) display, an organic light Emitting diode (OLED) display, a micro electro mechanical system (MEMS) display, or an electronic paper display. The display 160 may display various types of content (e.g., text, images, videos, icons, and/or symbols) for a user. The display 160 may include a touch screen and may receive a touch, a gesture, a proximity input, or a hovering input using an electronic pen or the user's body part. The communication interface 170 may set communication between the electronic device 101 and a first external electronic device 102, a second external electronic device 104, or a server 106. The communication interface 170 may be connected to a network 162 through wireless or wired communication to communicate with the second external electronic device 104 or the server 106.

The wireless communication may include a cellular communication that uses at least one of long term evolution (LTE), LTE-Advanced (LTE-A), code division multiple access (CDMA), wideband CDMA (WCDMA), universal mobile telecommunications system (UNITS), wireless broadband (WiBro), or global system for mobile communications (GSM). The wireless communication 164 may include at least one of wireless fidelity (WiFi), lite fidelity (LiFi), Bluetooth (BT), BT Low Energy (BLE), ZigBee, near field communication (NFC), magnetic secure transmission, radio frequency (RF), and body area network (BAN). The wireless communication may include GNSS, such as a global positioning system (GPS), a global navigation satellite system (Glonass), a BeiDou navigation satellite system (BeiDou), or Galileo, the European global satellite-based navigation system. Hereinafter, in this document, the term "GPS" may be interchangeable with the term "GNSS". The wired communication may include at least one of a universal serial bus (USB), a high definition multimedia interface (HDMI), recommended standard 232 (RS-232), a power line communication, and a plain old telephone service (POTS), and the like. The network 162 may include a telecommunications network, such as at least one of a computer network (e.g., a local area network (LAN) or a wide area network (WAN)), the Internet, and a telephone network.

Each of the first and second external electronic devices 102 and 104 may be of the same or a different type from the electronic device 101. All or some of the operations executed in the electronic device 101 may be executed in another electronic device, the electronic devices 102 and 104 or the server 106. When the electronic device 101 has to perform some functions or services automatically or in response to a request, the electronic device 101 may make a request for performing at least some functions relating thereto to the electronic device 102 or 104 or the server 106 instead of performing the functions or services by itself or in a manner of adding thereto. The electronic device 102 or 104 or the server 106 may execute the requested functions or the additional functions, and may deliver the result of the execution to the electronic device 101. The electronic device 101 may provide the received result as it is, or may additionally process the received result to provide the requested functions or services. To this end, cloud computing, distributed computing, or client-server computing technology may be used.

Figure 2:
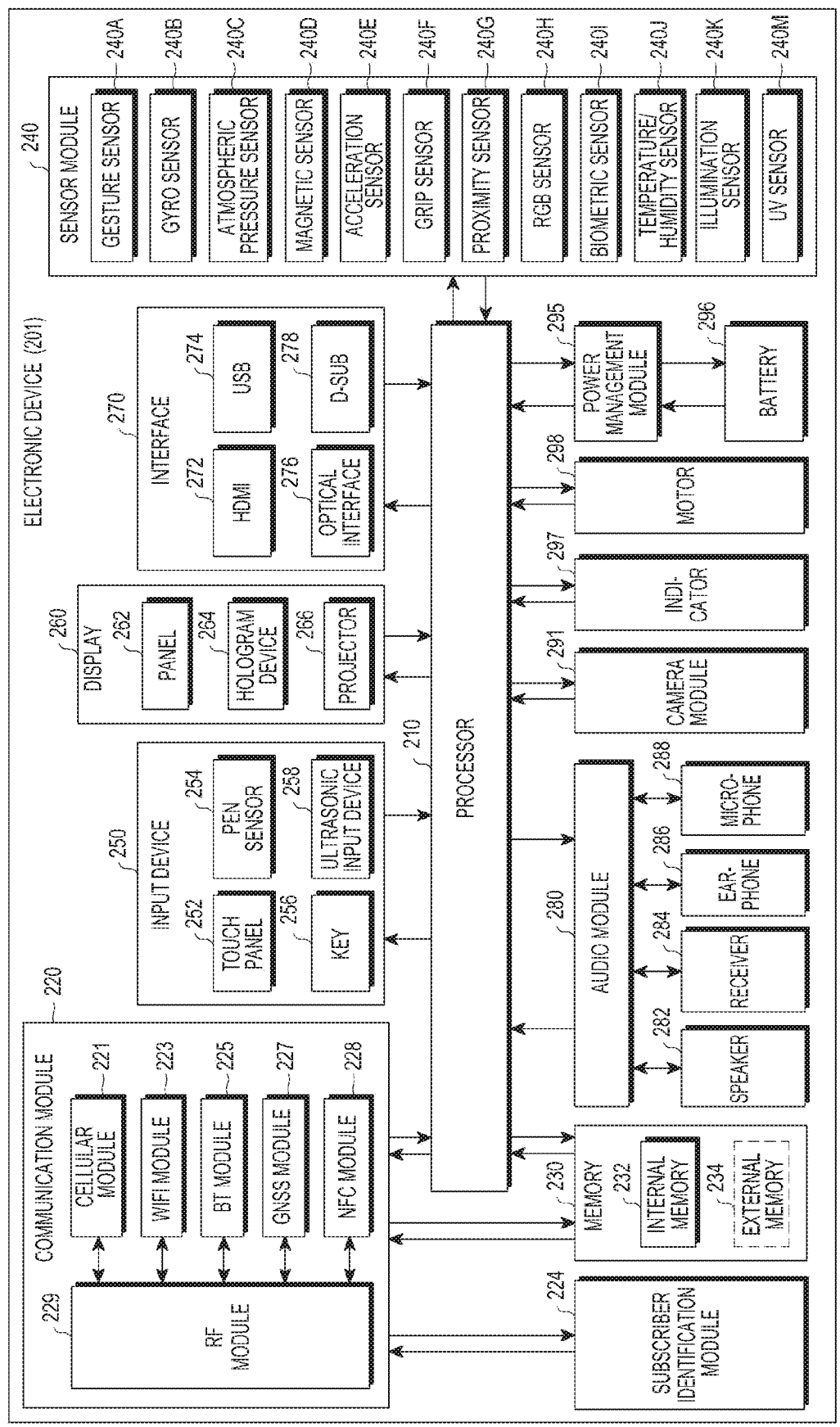
FIG. 2 is a block diagram of a programming module, according to an embodiment of the present disclosure.

FIG. 2 is a block diagram of an electronic device 201, according to an embodiment of the present disclosure. The electronic device 201 may include the whole or a part of the electronic device 101 illustrated in FIG. 1. The electronic device 201 may include at least one processor 210 (e.g., an AP), a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210 may control a plurality of hardware or software elements connected thereto and may perform various data processing and operations by driving an OS or an application program. The processor 210 may be implemented by a system on chip. The processor 210 may further include a graphic processing unit (GPU) and/or an image signal processor. The processor 210 may also include at least some of the elements illustrated in FIG. 2 (e.g., a cellular module 221). The processor 210 may load, in a volatile memory, instructions or data received from at least one of the other elements (e.g., a non-volatile memory), process the loaded instructions or data, and store the resultant data in the non-volatile memory.

The communication module 220 may have a configuration that is the same as, or similar to, that of the communication interface 170. The communication module 220 may include the cellular module 221, a Wi-Fi module 223, a BT module 225, a GNSS module 227, an NFC module 228, and an RF module 229. The cellular module 221 may provide a voice call, a video call, a text message service, or an Internet service through a communication network. The cellular module 221 may identify and authenticate the electronic device 201 within a communication network using the SIM 224. The cellular module 221 may perform at least some of the functions that the processor 210 may provide. The cellular module 221 may include a CP. At least some of the cellular module 221, the Wi-Fi module 223, the BT module 225, the GNSS module 227, and the NFC module 228 may be included in one integrated chip (IC) or IC package. The RF module 229 may transmit/receive a communication signal (e.g., an RF signal). The RF module 229 may include a transceiver, a power amp module (PAM), a frequency filter, a low noise amplifier (LNA), or an antenna. At least one of the cellular module 221, the Wi-Fi module 223, the BT module 225, the GPS module 227, and the NFC module 228 may transmit/receive an RF signal through a separate RF module. The SIM 224 may include a card that includes an embedded SIM, and may contain unique identification information (e.g., an integrated circuit card identifier (IC- CID)) or subscriber information (e.g., an international mobile subscriber identity (IMSI)).

The memory 230 (e.g., the memory 130) may include an internal memory 232 or an external memory 234. The internal memory 232 may include at least one of a volatile memory (e.g., a dynamic RAM (DRAM), a static RAM (SRAM), or a synchronous dynamic RAM (SDRAM)) and a non-volatile memory (e.g., a one time programmable ROM (OTPROM), a programmable ROM (PROM), an erasable ROM (EPROM), an electrically erasable and programmable ROM (EEPROM), a mask ROM, a flash ROM, a flash memory, a hard disk drive, or a solid state drive (SSD)). The external memory 234 may include a flash drive (e.g., a compact flash (CF), a secure digital (SD), a micro-SD, a mini-SD, an extreme digital (xD), a multi-media card (MMC), and a memory stick. The external memory 234 may be functionally or physically connected to the electronic device 201 through various interfaces.

The sensor module 240 may measure a physical quantity or detect the operating state of the electronic device 201 and may convert the measured or detected information into an electrical signal. The sensor module 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green, blue (RGB) sensor), a biometric sensor 240I, a temperature/humidity sensor 240J, an illumination sensor 240K, and an ultraviolet (UV) sensor 240M. Additionally or alternatively, the sensor module 240 may include an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. The electronic device 201 may further include a processor, which is configured to control the sensor module 240, as a part of the processor 210 or separately from the processor 210 in order to control the sensor module 240 while the processor 210 is in a sleep state.

The input device 250 may include a touch panel 252, a (digital) pen sensor 254, a key 256, or an ultrasonic input device 258. The touch panel 252 may use at least one of a capacitive type method, a resistive type method, an infrared type method, and an ultrasonic type method. Furthermore, the touch panel 252 may further include a control circuit and a tactile layer to provide a tactile reaction to a user. The (digital) pen sensor 254 may include a recognition sheet that is a part of, or separate from, the touch panel. The key 256 may include a physical button, an optical key, or a keypad. The ultrasonic input device 258 may detect ultrasonic waves, which are generated by an input tool, through a microphone 288 to identify data corresponding to the detected ultrasonic waves.

The display 260 (e.g., the display 160) may include a panel 262, a hologram device 264, a projector 266, and/or a control circuit for controlling the same. The panel 262 may be implemented to be flexible, transparent, or wearable. The panel 262, together with the touch panel 252, may be configured as one or more modules. The panel 262 may include a pressure sensor (or a POS sensor) which may measure a strength of pressure of a user's touch. The pressure sensor may be implemented so as to be integrated with the touch panel 252 or may be implemented as one or more sensors separate from the touch panel 252. The hologram device 264 may show a three dimensional (3D) image in the air by using a light interference. The projector 266 may display an image by projecting light onto a screen. The screen may be located in the interior of, or on the exterior of, the electronic device 201. The interface 270 may include an HDMI 272, a USB 274, an optical interface 276, or a D-subminiature (D-sub) 278. The interface 270 may be included in the communication interface 170 illustrated in FIG. 1. Additionally or alternatively, the interface 270 may include a mobile high-definition link (MHL) interface, an SD card/MMC interface, or an Infrared Data Association (IrDA) standard interface.

The audio module 280 may convert sound into an electrical signal, and vice versa. At least some elements of the audio module 280 may be included in the input/output interface 145 illustrated in FIG. 1. The audio module 280 may process sound information that is input or output through a speaker 282, a receiver 284, earphones 286, or the microphone 288. The camera module 291 is a device that can photograph a still image and a moving image, and may include one or more image sensors (e.g., a front sensor or a rear sensor), a lens, an image signal processor (ISP), or a flash (e.g., an LED or xenon lamp).

The power management module 295 may manage the power of the electronic device 201. The power management module 295 may include a power management integrated circuit (PMIC), a charger IC, or a battery gauge. The PMIC may use a wired and/or wireless charging method. The wireless charging method may include a magnetic resonance method, a magnetic induction method, and an electromagnetic wave method. Additional circuits (e.g., a coil loop, a resonance circuit, or a rectifier) for wireless charging may be further included. The battery gauge may measure the remaining charge of the battery 296 and a voltage, current, or temperature while charging. The battery 296 may include a rechargeable battery and/or a solar battery.

The indicator 297 may display a particular state, such as a booting state, a message state, or a charging state of the electronic device 201 or a part (e.g., the processor 210) of the electronic device 201. The motor 298 may convert an electrical signal into a mechanical vibration and may generate vibration or haptic effects. The electronic device 201 may include a mobile TV support device (e.g., GPU) that can process media data according to a standard, such as digital multimedia broadcasting (DMB), digital video broadcasting (DVB), or MediaFlo™. Each of the above-described elements of hardware may be configured with one or more components, and the names of the corresponding elements may vary based on the type of electronic device. The electronic device 201 may omit some elements or may further include additional elements, or some of the elements of the electronic device 201 may be combined with each other to configure a single entity, in which case the electronic device 201 may identically perform the functions of the corresponding elements prior to the combination thereof.

Figure 3:
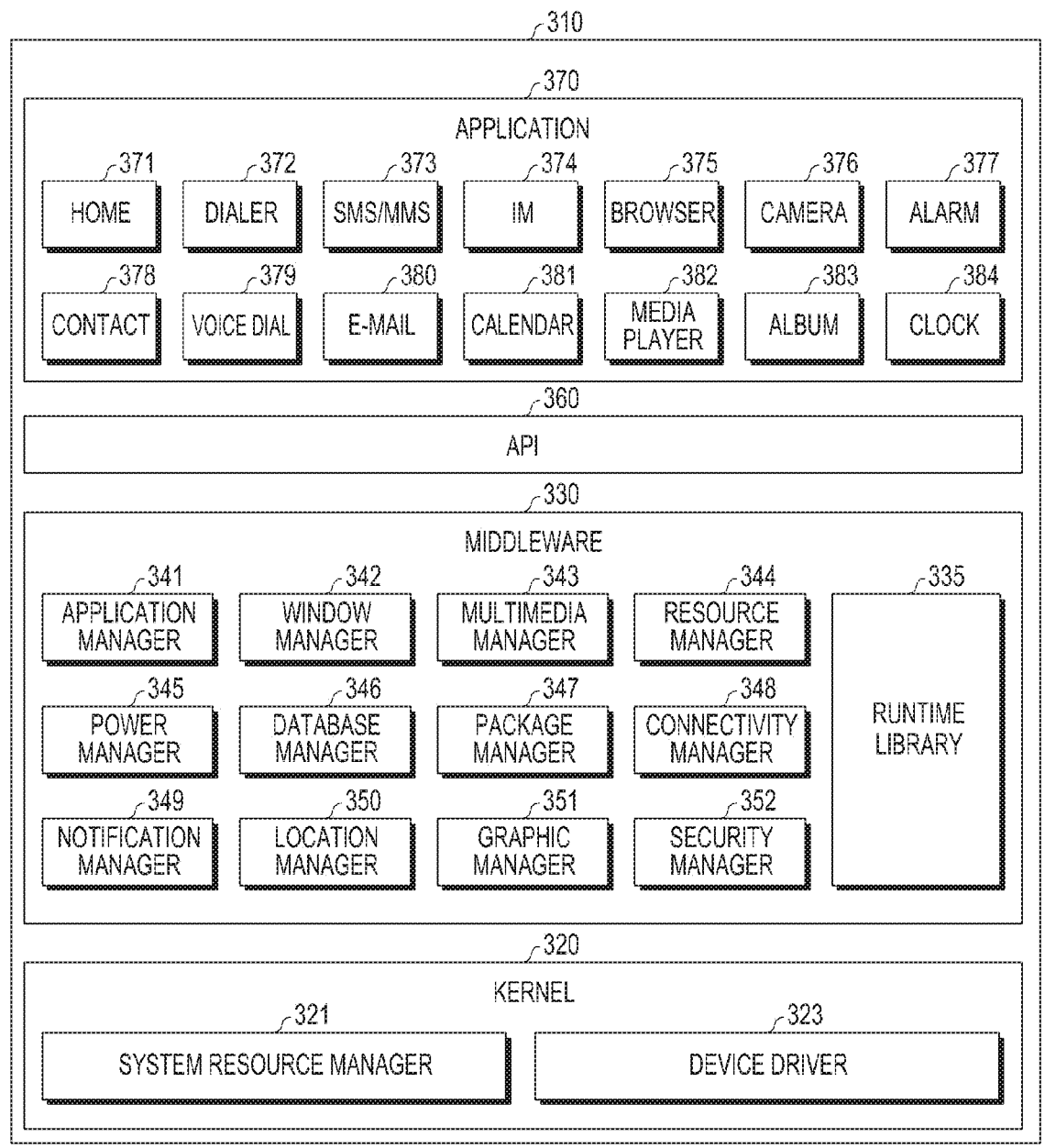
FIG. 3 is a block diagram of an electronic device, according to an embodiment of the present disclosure.

FIG. 3 is a block diagram of a program module, according to an embodiment of the present disclosure. The program module 310 (e.g., the program 140) may include an OS that controls resources relating to the electronic device 101 and/or various application programs 147 that are driven on the OS. The OS may include Android™, iOS™, Windows™, Symbian™, Tizen™, or Bada™.

The program module 310 may include a kernel 320 (e.g., the kernel 141), middleware 330 (e.g., the middleware 143), an API 360 (e.g., the API 145), and/or applications 370 (e.g., the application programs 147). At least a part of the program module 310 may be preloaded on the electronic device, or may be downloaded from the electronic device 102 or 104 or the server 106.

The kernel 320 may include a system resource manager 321 and/or a device driver 323. The system resource manager 321 may control, allocate, or retrieve system resources. The system resource manager 321 may include a process manager, a memory manager, or a file system manager. The device driver 323 may include a display driver, a camera driver, a Bluetooth driver, a shared memory driver, a USB driver, a keypad driver, a WiFi driver, an audio driver, or an inter-process communication (IPC) driver. The middleware 330 may provide a function required by the applications 370 in common, or may provide various functions to the applications 370 through the API 360 such that the applications 370 can efficiently use limited system resources within the electronic device. The middleware 330 may include at least one of a runtime library 335, an application manager 341, a window manager 342, a multi-media manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while the applications 370 are being executed. The runtime library 335 may manage an input/output, manage a memory, or process arithmetic functions. The application manager 341 may manage the life cycles of the applications 370. The window manager 342 may manage GUI resources used for a screen. The multimedia manager 343 may identify formats required for reproducing various media files and may encode or decode a media file using a codec suitable for the corresponding format. The resource manager 344 may manage the source code of the applications 370 or the space in memory. The power manager 345 may manage the capacity, temperature, or power of a battery and may determine or provide power information required for operation of the electronic device by using the said information. The power manager 345 may operate in conjunction with a basic input/output system (BIOS). The database manager 346 may generate, search, or change databases to be used by the applications 370. The package manager 347 may manage the installation or update of an application that is distributed in the form of a package file.

The connectivity manager 348 may manage a wireless connection. The notification manager 349 may provide, to a user, an event, such as an arrival message, an appointment, and a proximity notification. The location manager 350 may manage the location information of the electronic device. The graphic manager 351 may manage a graphic effect to be provided to a user or a user interface relating to the graphic effect. The security manager 352 may provide system security or user authentication.

The middleware 330 may include a telephony manager for managing a voice or video call function of the electronic device or a middleware module that is capable of forming a combination of the functions of the above-described elements. The middleware 330 may provide specialized modules according to the types of OSs. Furthermore, the middleware 330 may dynamically remove some of the existing elements, or may add new elements. The API 360 is a set of API programming functions, and may be provided with different configurations depending on the OS. In the case of Android™ or iOS™, one API set may be provided for each platform, and in the case of Tizen™, two or more API sets may be provided for each platform.

Figure 4:
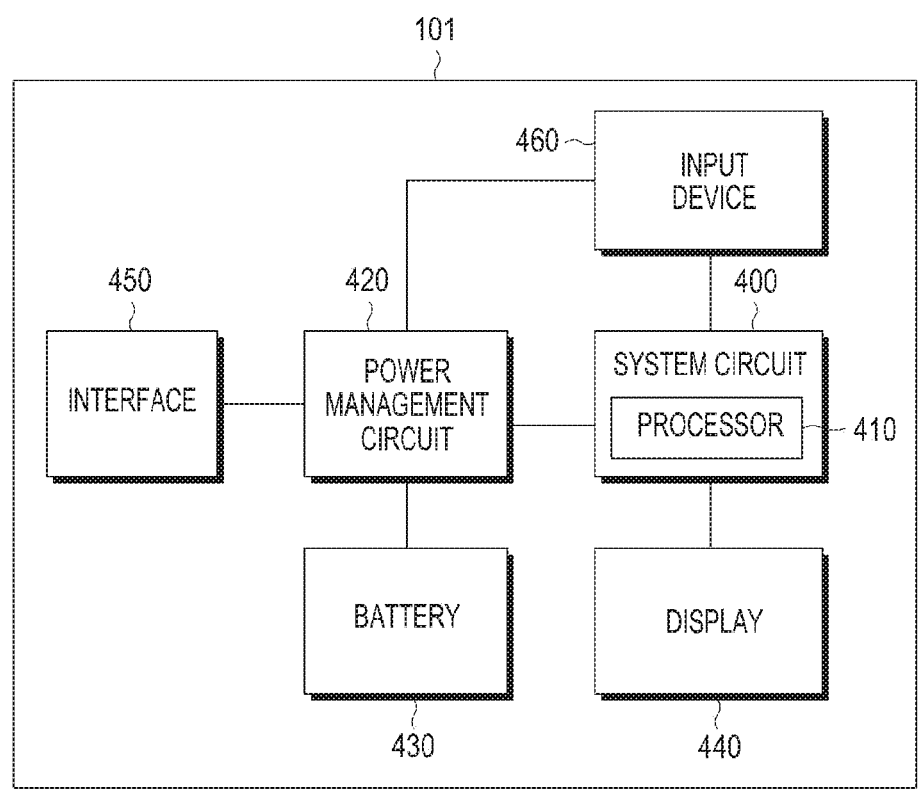
FIG. 4 is a block diagram of an electronic device, according to an embodiment of the present disclosure.

FIG. 4 is a block diagram of an electronic device, according to an embodiment of the present disclosure.

According to the present disclosure, an electronic device 101 may include a system circuit 400 including a processor 410 (e.g., the processor 120 or 210), a power management circuit 420 (e.g., the power management module 295), a battery 430 (e.g., the battery 296), a display 440 (e.g., the display 160 or 260), an interface 450, and an input device 460 (e.g., the input device 250).

According to the present disclosure, the system circuit 400 may include at least one element included in the electronic device 101. For example, at least one element included in the electronic device 101 may be one of the elements illustrated in FIG. 1 or FIG. 2.

According to the present disclosure, the processor 410 is included in the system circuit 400 and may control operations of the elements included in the system circuit 400, the power management circuit 420, or the display 440.

According to the present disclosure, the power management circuit 420 may supply power from the battery 430 to the system circuit 400 or the display 440. The power management circuit 420 may charge the battery 430 using at least some of an external power input through the interface 450 and may supply another part of the external power to the system circuit 400 or the display 440. The system circuit 400 or the display 440 may be operated using power supplied by the battery 430 or at least some of the supplied external power.

According to the present disclosure, the electronic device 101 may be connected by wire or may be wirelessly connected to an external electronic device (e.g., a charger) that supplies external power, through the interface 450. The electronic device 101 may receive external power supplied by wire or wirelessly supplied from an external electronic device connected by wire or wirelessly to the electronic device 101 through the interface 450. The interface 450 may include a connector (e.g., a USB) that connects the external electronic device by wire, or a resonance circuit (e.g., a wireless charging coil) that wirelessly connects the external electronic device.

According to the present disclosure, the power management circuit 420 may detect an input of external power through the interface 450. An external power input from an external electronic device wirelessly connected or connected by wire to the electronic device 101 through the interface 450 is supplied to the power management circuit 420. The power management circuit 420 may detect an input of the external power.

According to the present disclosure, the power management circuit 420 may identify a voltage of the battery 430 in response to the detection of the input of the external power. The power management circuit 420 may identify the voltage of the battery 430 through a measurement circuit (e.g., a power gauge) that is included in the power management circuit 420 and measures the voltage of the battery 430. The measurement circuit may sense voltages of an anode terminal and a cathode terminal of the battery 430 to measure the voltage of the battery 430, or may measure the voltage of the battery 430 through a separate cell voltage sensing terminal for the battery 430 that directly measures a cell voltage of the battery 430. The power management circuit 420 may control charging of the battery 430 on the basis of a voltage of the battery 430 identified through the measurement circuit.

According to the present disclosure, the power management circuit 420 may identify a voltage of the battery 430 immediately after an input of external power is detected or after passage of a designated time interval after the input of the external power is detected.

According to the present disclosure, the power management circuit 420 may periodically identify the voltage of the battery 430 and may use a voltage of the battery 430 identified at a closest time point based on a first time point at which the power management circuit 420 detects an input of the external power. In a case where a second time point at which the voltage of the battery 430, identified before the first time point, is closer to the first time point than a third time point at which the voltage of the battery 430, identified after the first time point, the power management circuit 420 may use a voltage of the battery 430 identified at the second time point.

According to the present disclosure, when an identified voltage of the battery 430 belongs to a first designated voltage range, the power management circuit 420 may avoid charging the battery 430 using the input external power and may supply the input external power to the system circuit 400. For example, when a voltage of the battery 430 belongs to a first designated voltage range, the battery 430 may be in an over discharged state and may be damaged when being charged. The power management circuit 420 may prevent supplying the input external power to the battery 430, in order to prevent the damage of the battery 430.

According to the present disclosure, when an identified voltage of the battery 430 is less than a designated first voltage value, the power management circuit 420 may determine that a voltage of the battery 430 belongs to the first designated voltage range. For example, the first voltage value is a voltage value which is a standard for determining whether the battery 430 is charged, and may be designated to be a value between about 1.5 V and 2.1 V. The first voltage value may also be designated to be a voltage value other than the aforementioned voltage value, depending on an external temperature, a characteristic of the battery 430, or a setting of the electronic device 101.

For example, when an external temperature of the electronic device 101 is measured by using a temperature sensor (e.g., the temperature/humidity sensor 240) and the measured external temperature is beyond a designated temperature range (e.g., less than or equal to about 0 degrees Celsius, or greater than or equal to about 45 degrees Celsius), the first voltage value may be modified to have a smaller voltage value. According to another embodiment of the present disclosure, when the number of times of charging and discharging of the battery 430 is greater than or equal to a designated number, the first voltage value may be modified to have a smaller voltage value. For example, when the first voltage value is designated to be about 1.5 V, the first voltage value may be modified to be about 1.4 V depending on the external temperature or the number of times of charging and discharging of the battery 430.

According to the present disclosure, the power management circuit 420 may include at least one switch that supplies the input external power to the system circuit 400 or the battery 430. The at least one switch may be connected to one end of the system circuit 400 and one end of the battery 430.

According to the present disclosure, before an input of external power is detected, the power management circuit 420 may control the at least one switch such that a line through which the external power is supplied to the battery 430 is opened. Before an input of external power is detected, the power management circuit 420 may control the at least one switch to be turned off.

According to the present disclosure, the line through which the external power is supplied to the battery 430 may be distinguished from a line through which the power of the battery 430 is supplied to the system circuit 400. The power of the battery 430 may be supplied to the system circuit 400 through a line through which the power of the battery 430 is supplied to the system circuit 400, regardless of the detection of the input of the external power.

According to the present disclosure, the power management circuit 420 controls the at least one switch in response to the detection of an input of external power, and controls whether to supply the external power to the battery 430. The power management circuit 420 may control the at least one switch in order to open the line through which the external power is supplied to the battery 430 (e.g., turns off the at least one switch), to prevent supplying the external power to the battery 430. According to another embodiment of the present disclosure, the power management circuit 420 may control the at least one switch such that the line through which the external power is supplied to the battery 430 is short-circuited (e.g., turns on the at least one switch), to allow supplying of the external power to the battery 430.

According to the present disclosure, when an identified voltage of the battery 430 belongs to the first designated voltage range, the power management circuit 420 may control the at least one switch such that the input external power is supplied to the system circuit 400 and the input external power is not supplied to the battery. For example, the power management circuit 420 may control the at least one switch such that the line through which the external power is supplied to the battery 430 is opened.

According to the present disclosure, when an identified voltage of the battery 430 belongs to a second designated voltage range, the power management circuit 420 may charge the battery 430 using at least some of the input external power. For example, when the voltage of the battery 430 belongs to the second designated voltage range, the battery 430 may be in an over discharged state. However, a current supplied to the battery 430 during charging can be regulated, so that damage resulting from the charging may not occur. The power management circuit 420 may supply, to the battery 430, a remaining power not including a power required for managing the system circuit 400 from the input external power, to charge the battery 430.

According to the present disclosure, when an identified voltage of the battery 430 is greater than or equal to the designated first voltage value and is less than a designated second voltage value, the power management circuit 420 may determine that the voltage of the battery 430 belongs to the second designated voltage range. The second voltage value may be a voltage value which is a standard for determining whether the battery 430 is in an over discharged state, and may be designated to be a voltage value between about 3.5 V and 4 V. The second voltage value may also be designated to be a voltage value other than the aforementioned voltage value, depending on an external temperature, a characteristic of the battery 430, or a setting of the electronic device 101. For example, when an external temperature of the electronic device 101 is measured by using the temperature/humidity sensor 240 and the measured external temperature is beyond a designated temperature range (e.g., less than or equal to about 0 degrees Celsius, or greater than or equal to about 45 degrees Celsius), the second voltage value may be modified to have a smaller voltage value. According to an embodiment of the present disclosure, when the number of times of charging and discharging of the battery 430 is greater than or equal to a designated number of times, the second voltage value may be modified to have a smaller voltage value. For example, when the second voltage value is designated to be about 3.5

V, the second voltage value may be modified to be about 3.4 V depending on the external temperature or the number of times of charging and discharging of the battery 430.

According to the present disclosure, when an identified voltage of the battery 430 belongs to the second designated voltage range, the power management circuit 420 may control the at least one switch such that the at least some of the input external power is supplied to the battery 430. For example, the power management circuit 420 may control the at least one switch such that the line through which the external power is supplied to the battery 430 is short-circuited.

According to the present disclosure, when an identified voltage of the battery 430 belongs to the second designated voltage range, the power management circuit 420 may regulate a current supplied to the battery 430 in order to charge the battery 430 without damaging the battery 430. In order to determine a degree of the regulation of the current supplied to the battery 430, the power management circuit 420 may compare the identified voltage of the battery 430 with a designated third voltage value.

According to the present disclosure, when the voltage of the battery 430 is less than the third voltage value even when the voltage of the battery 430 belongs to the second designated voltage range, the battery 430 may be damaged by receiving a current that is used for charging the battery 430 in a state where the battery 430 has not been over-discharged. The power management circuit 420 is required to regulate a current supplied to the battery 430 in order to charge the battery 430 without damaging the battery 430.

According to the present disclosure, the third voltage value may be designated to be a voltage value which is a standard for determining whether to supply, to the battery 430, a current smaller than a current used for charging the battery 430 in a state where the battery 430 has not been over-discharged. For example, the third voltage value may be designated to be about 3.1 V, between the first voltage value and the second voltage value, depending on an external temperature, a characteristic of the battery 430, or a setting of the electronic device 101.

According to the present disclosure, when an external temperature of the electronic device 101 is measured by using the temperature/humidity sensor 240 and the measured external temperature is beyond a designated temperature range (e.g., less than or equal to about 0 degrees Celsius, or greater than or equal to about 45 degrees Celsius), the third voltage value may be modified to have a smaller voltage value. When the number of times of charging and discharging of the battery 430 is greater than or equal to a designated number of times, the third voltage value may be modified to have a smaller voltage value. For example, when the third voltage value is designated to be about 3.1 V, the third voltage value may be modified to be about 3 V depending on the external temperature or the number of times of charging and discharging of the battery 430.

According to the present disclosure, the power management circuit 420 may regulate a current supplied to the battery 430, on the basis of a result obtained by comparing a voltage of the battery 430 with the designated third voltage value. The power management circuit 420 may regulate a current supplied to the battery 430 by regulating a voltage of at least some of the external power supplied to the battery 430.

According to the present disclosure, when an identified voltage of the battery 430 belongs to the second designated voltage range and the voltage of the battery 430 is less than the third voltage value, the power management circuit 420 may regulate a voltage of at least some of the external power such that a current supplied to the battery 430 belongs to a first designated current range.

According to the present disclosure, the first designated current range may be designated to be a current range in which the battery 430 can be charged without damaging the battery 430 when the voltage of the battery 430 belongs to the second designated voltage range and is less than the third voltage value. For example, the first designated current range may have a maximum current value less than or equal to about 450 mA, and have a current value smaller than a current used for charging the battery 430 in a state where the battery 430 has not been over-discharged. The first designated current range may be also designated to be a current range other than the aforementioned current range, depending on an external temperature, a characteristic of the battery 430, or a setting of the electronic device 101.

According to the present disclosure, when an external temperature of the electronic device 101 is measured by using a temperature sensor (e.g., the temperature/humidity sensor 240) and the measured external temperature is beyond a designated temperature range (e.g., less than or equal to about 0 degrees Celsius, or greater than or equal to about 45 degrees Celsius), the maximum current value of the first designated current range may be modified to have a smaller current value. According to an embodiment of the present disclosure, when the number of times of charging and discharging of the battery 430 is greater than or equal to a designated number of times, the maximum current value of the first designated current range may be modified to have a smaller current value. For example, when the maximum current value of the first designated current range is designated to be about 450 mA, the maximum current value of the first designated current range may be about 400 mA depending on the external temperature or the number of times of charging and discharging of the battery 430.

According to the present disclosure, the power management circuit 420 may identify the voltage of the battery 430 after passage of a designated time interval after a current regulated to belong to the first designated current range has been supplied to the battery 430. In order to identify a state of the battery 430 according to the regulated current supplied to the battery 430, the power management circuit 420 may identify the voltage of the battery 430.

According to the present disclosure, for example, when a voltage of the battery identified after passage of the designated time interval (e.g., about 30 minutes) is less than the third voltage value, the power management circuit 420 may stop charging the battery 430 using at least some of the external power. When a voltage of the battery 430 identified after passage of the designated time interval fails to reach the third threshold voltage value, the power management circuit 420 determines that damage could occur to the battery 430, and may stop charging of the battery 430.

According to the present disclosure, when the identified voltage of the battery 430 belongs to the second designated voltage range and the voltage of the battery 430 is greater than or equal to the third voltage value, the power management circuit 420 may regulate a voltage of at least some of the external power such that a current supplied to the battery 430 belongs to a second designated current range. For example, the second designated current range may have a current value greater than a maximum current value of the first designated current range. The second designated current range may correspond to a current used for charging the battery 430 in a state where the battery 430 has not been over-discharged.

According to the present disclosure, when the identified voltage of the battery 430 belongs to the first designated voltage range or the second designated voltage range, the processor 410 may operate the electronic device 101 in a first operation mode. In the following description, an operation of operating the electronic device 101 in a particular operation mode or converting the operation mode of the electronic device 101 is mainly performed by the processor 410. However, the present disclosure is not limited thereto, and the operation may be performed by the power management circuit 420. For example, in the first operation mode, the processor 410 may activate only some elements used for displaying notification information indicating the charging of the battery 430 or the state of the battery 430 among elements included in the electronic device 101. In the first operation mode, the processor 410 executes a boot loader stored in the electronic device 101, to activate only some elements. The processor 410 operating in the first operation mode may perform, through the at least some activated elements, only an operation of displaying notification information indicating the charging of the battery 430 or the state of the battery 430.

According to the present disclosure, when an identified voltage of the battery 430 does not belong to the first and the second designated voltage range, the processor 410 may operate the electronic device 101 in a second operation mode. In the second operation mode, the processor 410 may complete booting, may activate all the elements included in the electronic device 101, and may r According to the present disclosure, the input device 460 may obtain a user input that converts the operation mode of the electronic device from the first operation mode to the second operation mode. When the user input is obtained through the input device 460, the processor 410 may determine whether to convert the operation mode of the electronic device 101.

According to the present disclosure, when an identified voltage of the battery 430 does not belong to the first and the second designated voltage range, the processor 410 may convert the operation mode of the electronic device 101 from the first operation mode to the second operation mode, depending on a user input obtained through the input device 460.

According to the present disclosure, when an identified voltage of the battery 430 belongs to the first designated voltage range or the second designated voltage range, even when the user input is obtained through the input device 460, the processor 410 may maintain the operation mode of the electronic device 101 to be the first operation mode.

According to the present disclosure, the power management circuit 420 may transfer information on the identified voltage of the battery 430 to the processor 410. The information on the voltage of the battery 430 may be used when the processor 410 displays notification information indicating the state of the battery through the display 440. The processor 410 may determine the state of the battery 430 on the basis of information on the voltage of the battery 430 and then may display notification information indicating the determined state of the battery 430 through the display 440. The notification information may include a graphic object indicating the state of the battery 430 in order to allow a user to intuitionally recognize the notification information.

According to the present disclosure, when it is identified that the voltage of the battery 430 belongs to the first designated voltage range, on the basis of information on the voltage of the battery 430, the processor 410 may display first notification information indicating a first state of the battery 430 through the display 440. A first state of the battery 430 may indicate a state where the battery 430 is over discharged and a state where the battery 430 is not being charged because damage may occur when the battery 430 is charged.

According to the present disclosure, when it is identified that the voltage of the battery 430 belongs to the first designated voltage range, the processor 410 may operate the electronic device 101 in the first operation mode. In the first operation mode, as only some of the elements are activated, a function relating to the charging of the battery 430, provided from an OS operated in the electronic device 101 may not be performed. The function relating to the charging of the battery 430, provided from the OS may include a function for indicating a charge animation on the charge state of the battery 430, a state of charge (SoC) a calculation function, or a function for fast charging.

According to the present disclosure, in the first operation mode, the processor 410 may display the first notification information indicating the first state of the battery 430 by using the at least one element, rather than using the function relating to the charging of the battery 430, provided from the OS. The first notification information may be a low-resolution fixed image.

According to the present disclosure, when it is identified that the voltage of the battery 430 belongs to the first designated voltage range, the processor 410 may show, through the display 440, a warning message about the battery 430 by using the at least one element. The warning message may be a message showing a warning about a malfunction of the battery 430, or a request for visiting to a service center.

According to the present disclosure, when the voltage of the battery 430 belongs to the second designated voltage range, the processor 410 may display second notification information indicating a second state of the battery 430 through the display 440. The processor 410 may display the second notification information by using another part of external power, other than at least some of the external power supplied to the battery 430. The second state of the battery 430 may indicate a state where the battery 430 is over discharged, but is being charged.

According to the present disclosure, when it is identified that the voltage of the battery 430 belongs to the second designated voltage range, the processor 410 may operate the electronic device 101 in the first operation mode. In the first operation mode, as only some of the elements are activated, a function relating to the charging of the battery 430, provided from the OS, may not be performed.

According to the present disclosure, in the first operation mode, the processor 410 may display the second notification information indicating the second state of the battery 430 by using the at least one element, rather than using the function relating to the charging of the battery 430, provided from the OS. The second notification information may be a low-resolution fixed image.

According to an embodiment of the present disclosure, the first notification information, the second notification information, and/or the warning message may be stored in a boot loader executed in the first operation mode, or may be loaded through at least one code included in the boot loader.

According to an embodiment of the present disclosure, the processor 410 may identify the voltage of the battery 430 on the basis of information on the voltage of the battery 430 received from the power management circuit 420.

According to an embodiment of the present disclosure, when the voltage of the battery 430 belongs to the first designated voltage range, the processor 410 may control the power management circuit 420 such that the input external power is not supplied to the battery 430. For example, when the voltage of the battery 430 belongs to the first designated voltage range, the processor 410 controls the at least one switch included in the power management circuit 420, to prevent supplying the input external power to the battery 430.

According to an embodiment of the present disclosure, when the voltage of the battery 430 belongs to the second designated voltage range, the processor 410 may control the power management circuit 420 such that at least some of the input external power is supplied to the battery 430. For example, when the voltage of the battery 430 belongs to the second designated voltage range, the processor 410 controls the at least one switch, to allow at least some of the input external power to be supplied to the battery 430.

According to the present disclosure, when it is identified that the voltage of the battery 430 belongs to the second designated voltage range, the processor 410 may compare the voltage of the battery with the designated third voltage value. The processor 410 may control the power management circuit 420 such that a current supplied to the battery 430 is regulated, on the basis of the comparison result.

According to an embodiment of the present disclosure, the power management circuit 420 may determine whether to charge the battery 430 or may regulate a current supplied to the battery 430 depending on an autonomously identified voltage of the battery 430. The power management circuit 420 may determine whether to charge the battery 430 or may regulate a current supplied to the battery 430 depending on controlling of the processor 410.

Figure 5:
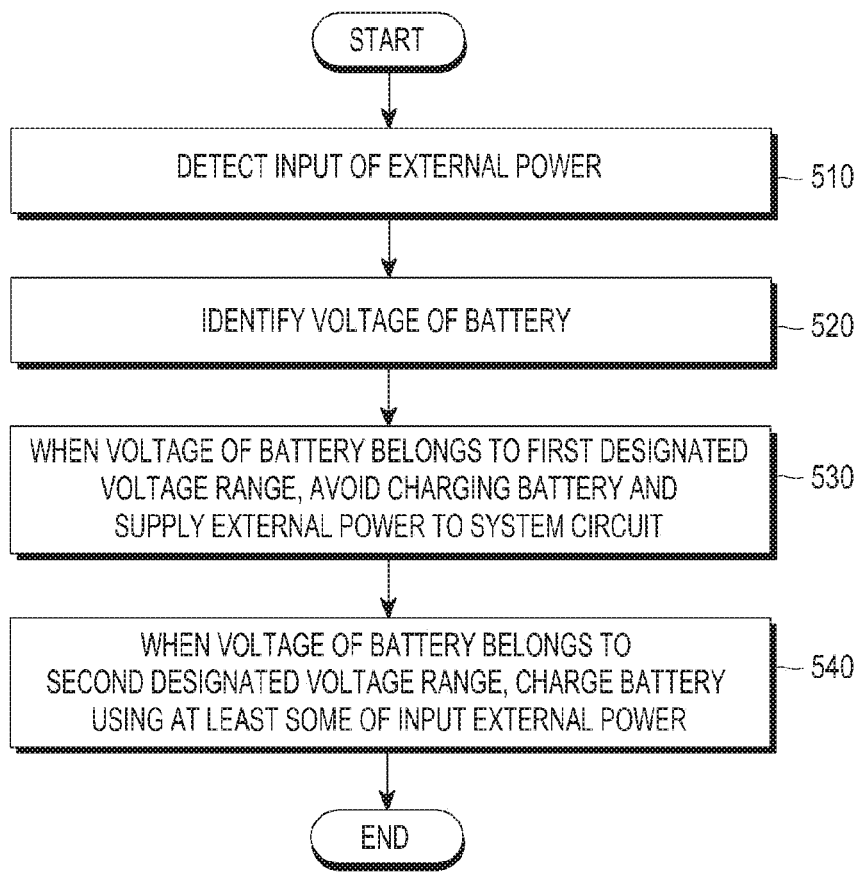
FIG. 5 is a flowchart of a method for charging a battery by an electronic device, according to an embodiment of the present disclosure.

FIG. 5 is a flowchart of a method for charging a battery by an electronic device, according to embodiment of the present disclosure.

In operation 510, the power management circuit 420 (e.g., the power management module 295) of the electronic device 101 may detect an input of an external power. For example, the power management circuit 420 may detect an external power input from an external electronic device connected by wire or wirelessly to the electronic device 101.

In operation 520, the power management circuit 420 may identify a voltage of the battery 430 in response to the detection of the input of the external power. For example, the power management circuit 420 may identify a voltage of the battery 430 through a measurement circuit that measures the voltage of the battery 430.

In operation 530, when the voltage of the battery 430 belongs to a first designated voltage range, the power management circuit 420 may avoid charging the battery using the input external power and may supply the input external power to the system circuit 400. The power management circuit 420 may cause the input external power not to be supplied to the battery 430, in order to prevent damage to the battery 430.

In operation 540, when the voltage of the battery 430 belongs to a second designated voltage range, the power management circuit 420 may charge the battery 430 using at least some of the input external power. For example, the power management circuit 420 may supply, to the battery 430, a remaining power not including a power required for managing the system circuit 400 from the input external power, to charge the battery 430.

Figure 6A:
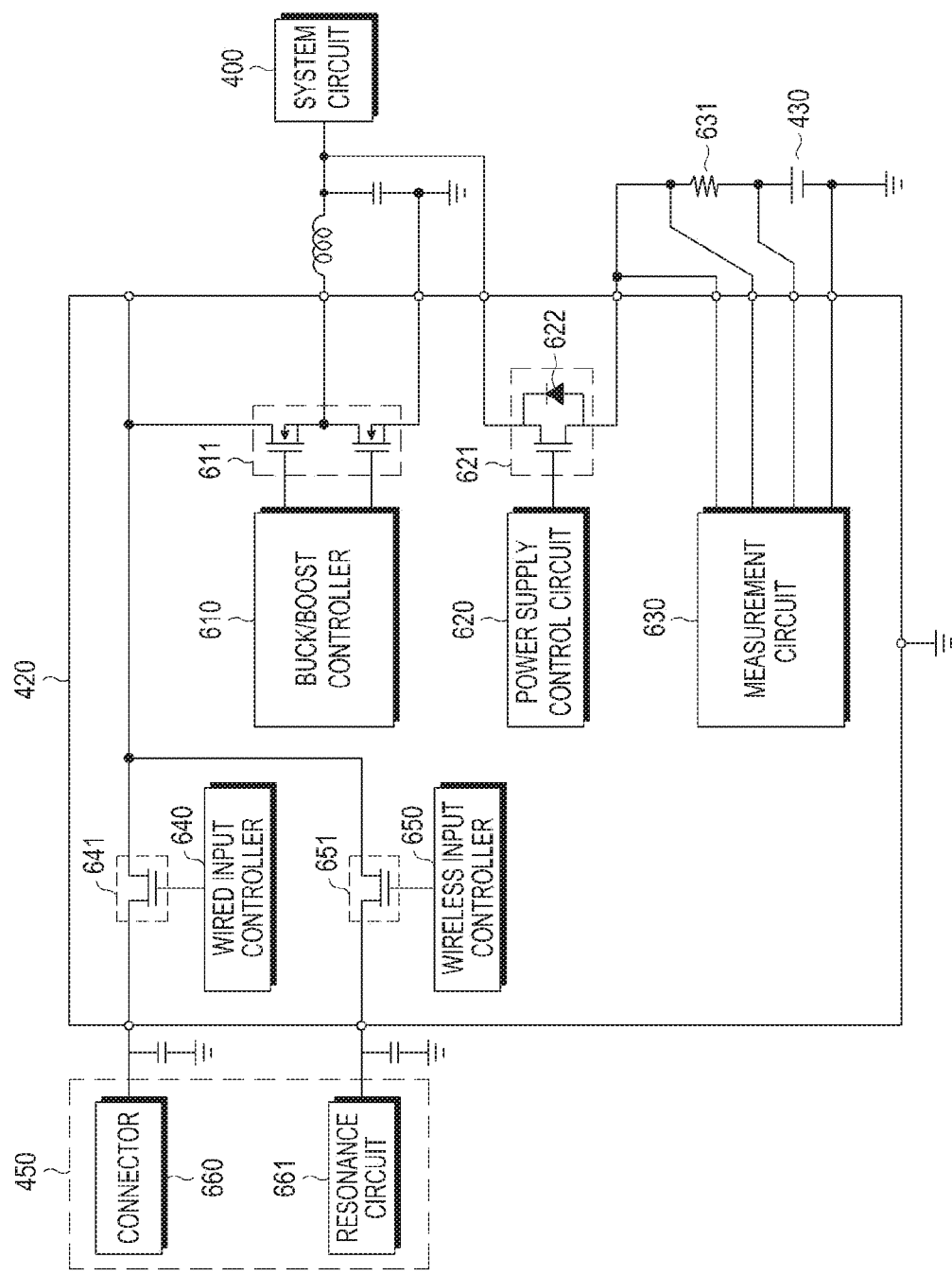
FIGS. 6A to 6C are circuit diagrams of a power management circuit included in an electronic device, according to embodiments of the present disclosure.
Figure 6B:
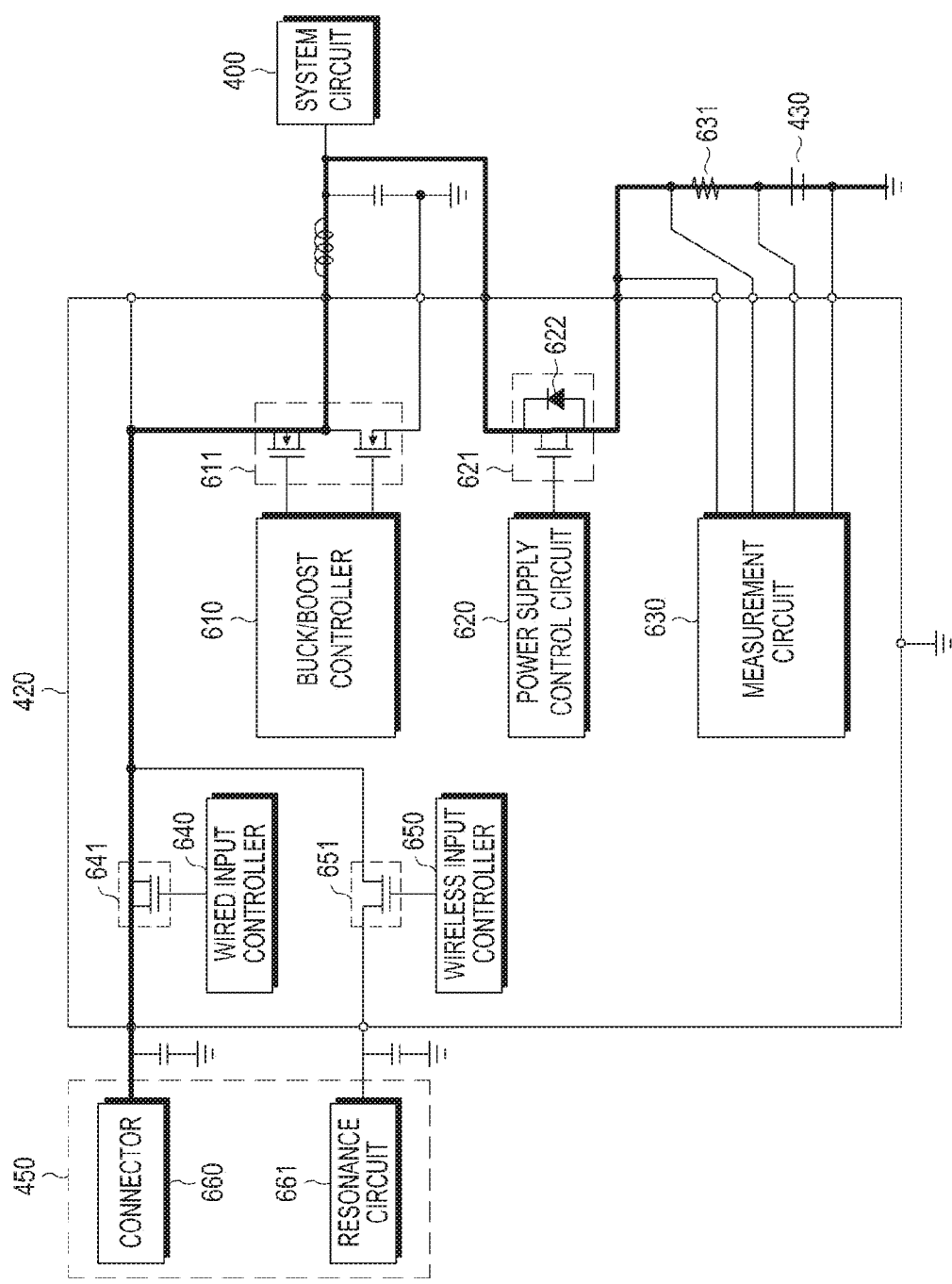
Figure 6C:
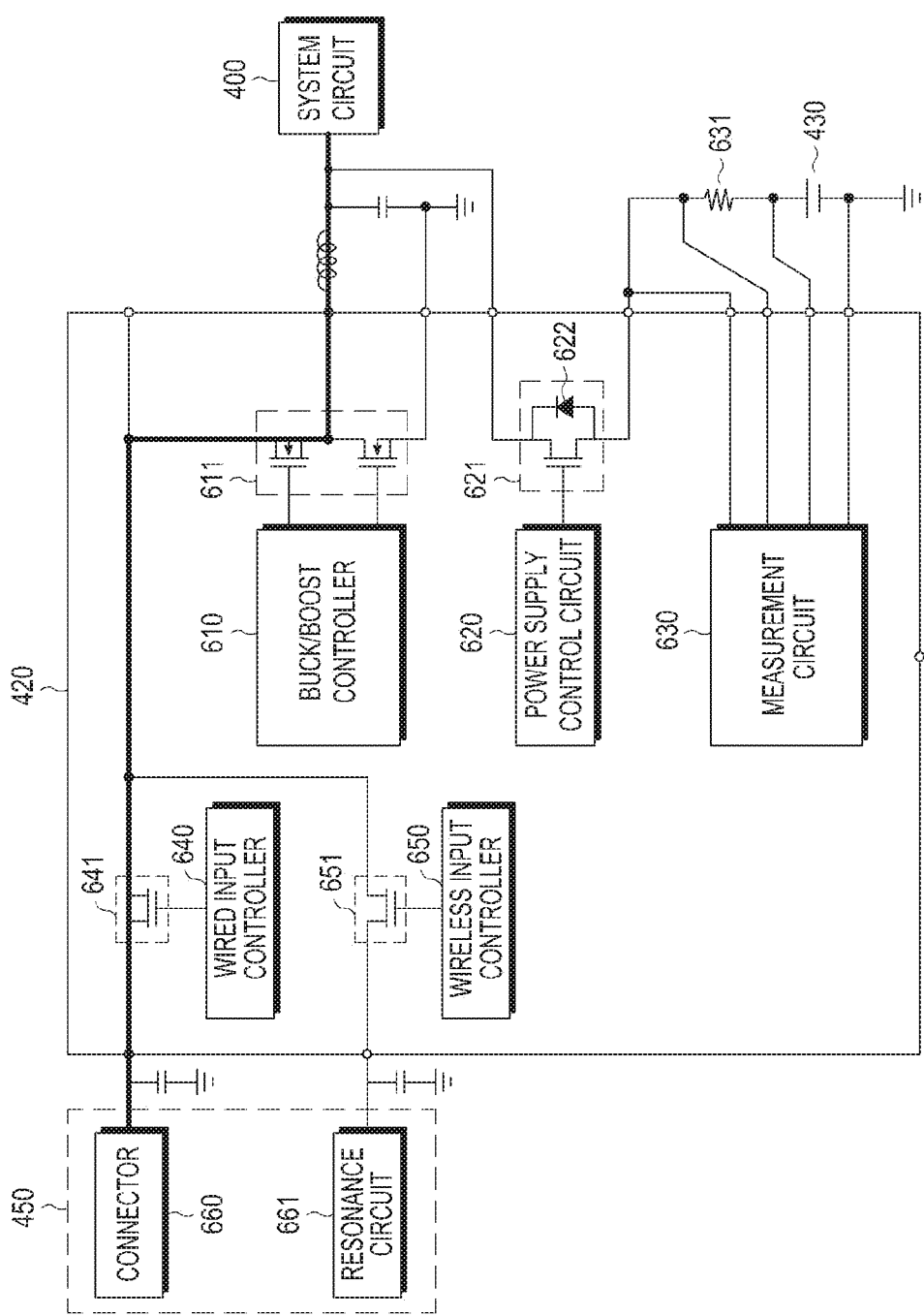

FIGS. 6A to 6C are circuit diagrams of a power management circuit included in an electronic device, according to embodiments of the present disclosure.

Referring to FIG. 6A, the power management circuit 420 may include a buck/boost controller 610, a buck/boost converter 611, a power supply control circuit 620, at least one first switch 621, a measurement circuit 630, a wired input controller 640, a second switch 641, a wireless input controller 650, and a third switch 651. The power management circuit 420 may be electrically connected to the system circuit 400, the battery 430, and the interface 450 including a connector 660 (e.g., a USB) or a resonance circuit 661 (e.g., a wireless charge coil).

According to the present disclosure, the power management circuit 420 may receive external power supplied from an external electronic device connected by wire through the connector 660, or the power management circuit 420 may receive external power supplied from an external electronic device connected wirelessly through the resonance circuit 661.

According to the present disclosure, the wired input controller 640 or the wireless input controller 650 may control the second switch 641 or the third switch 651, so as to control a supply of external power input by wire or wirelessly, to elements included in the electronic device 101. In order to prevent the damage to the elements included in the electronic device 101, when a current of external power input by wire or wirelessly is greater than or equal to a designated threshold current, the wired input controller 640 or the wireless input controller 650 may control the second switch 641 or the third switch 651 such that the external power is not supplied to the elements included in the electronic device 101.

According to the present disclosure, the buck/boost controller 610 may control the buck/boost converter 611. The buck/boost converter 611 may be a converter that converts a voltage of input external power. At least some of external power having a voltage converted by the buck/boost converter 611 may be supplied to the system circuit 400, and another part thereof may be supplied to the battery 430.

According to the present disclosure, the power supply control circuit 620 may control at least one first switch 621 to supply external power to the system circuit 400 or the battery 430. At least one first switch 621 may be connected to an end of the system circuit 400 and to an end of the battery 430.

According to the present disclosure, before an input of external power is detected, the power supply control circuit 620 may control at least one first switch 621 such that a line through which the external power is supplied to the battery 430 is opened. Before the input of the external power is detected, the power supply control circuit 620 may control at least one first switch 621 to be turned off.

Referring to FIG. 6B, when charging the battery 430, the power supply control circuit 620 may control at least one first switch 621 such that a line through which the external power is supplied to the battery 430 is short-circuited.

For example, when an identified voltage of the battery 430 belongs to the second designated range or is greater than or equal to the designated second voltage value, the power supply control circuit 620 may charge the battery 430.

Referring to FIG. 6C, when charging the battery 430 is limited, the power supply control circuit 620 may control at least one first switch 621 such that a line through which the external power is supplied to the battery 430 is maintained in an open state.

According to the present disclosure, when an identified voltage of the battery 430 belongs to the first designated voltage range, the power supply control circuit 620 may limit charging of the battery 430.

According to the present disclosure, at least one first switch 621 may include a diode 622 (e.g., a body diode). A line that connects the system circuit 400 and the battery 430 through the diode 622 may be used for supplying power of the battery 430 to the system circuit 400. The power supply control circuit 620 may control a power supply direction using the body diode 622 such that power is supplied from the battery 430 to the system circuit 400, and power is not supplied in a reverse direction. A line that connects the system circuit 400 and the battery 430 through the body diode 622 may be distinguished from a line through which the external power is supplied to the battery 430 wherein the line is opened or short-circuited by the at least one first switch 621.

According to the present disclosure, the measurement circuit 630 may measure a voltage of the battery 430. The measurement circuit 630 may include an element or a logic that looks for a charge state (state of charge) of the battery 430 on the basis of a charge and discharge current amount, a voltage sensing of the battery 430, or a temperature. For example, the measurement circuit 630 may include a coulomb counter that detects a current amount of a charge current. The power supply control circuit 620 and the measurement circuit 630 may be configured to be separate ICs, as illustrated in FIGS. 6A to 6C, or may be included in a single IC.

According to the present disclosure, the measurement circuit 630 may measure a voltage of the battery 430 by sensing voltages of an anode terminal and a cathode terminal of the battery 430, and may measure a voltage of the battery 430 through a separate cell voltage sensing terminal for the battery 430 that directly measures a cell voltage of the battery 430. The measurement circuit 630 may measure a current supplied to the battery 430 through a resistor 631. The current supplied to the battery 430, measured by the measurement circuit 630 may be used for identifying the capacity of the battery 430.

According to the present disclosure, the measurement circuit 630 may measure a voltage of the battery 430 immediately after an input of external power is detected or after passage of a designated time interval after the input of the external power is detected. The measurement circuit 630 may transfer information on the measured voltage of the battery 430 to the power supply control circuit 620, the buck/boost controller 610, or the processor 410 included in the system circuit 400.

According to the present disclosure, the measurement circuit 630 may periodically identify the voltage of the battery 430, and may transfer, to the power supply control circuit 620, the buck/boost controller 610, or the processor 410 included in the system circuit 400, information on the voltage of the battery 430 measured at a closest time point based on a first time point at which the measurement circuit 630 detects an input of the external power.

According to the present disclosure, the power supply control circuit 620, the buck/boost controller 610, or the processor 410 may identify the voltage of the battery 430 on the basis of the received information and may perform a corresponding operation on the basis of the identified voltage of the battery 430.

According to the present disclosure, when the identified voltage of the battery 430 belongs to the second designated voltage range and is less than the designated third threshold voltage value, the buck/boost controller 610 may regulate a voltage of at least some of external power supplied to the battery 430 such that a current supplied to the battery 430 belongs to the first designated current range.

According to the present disclosure, when the identified voltage of the battery 430 belongs to the second designated voltage range and is greater than or equal to the designated third threshold voltage value, the buck/boost controller 610 may regulate a voltage of at least some of external power supplied to the battery 430 such that a current supplied to the battery 430 belongs to the second designated current range.

Figure 7:
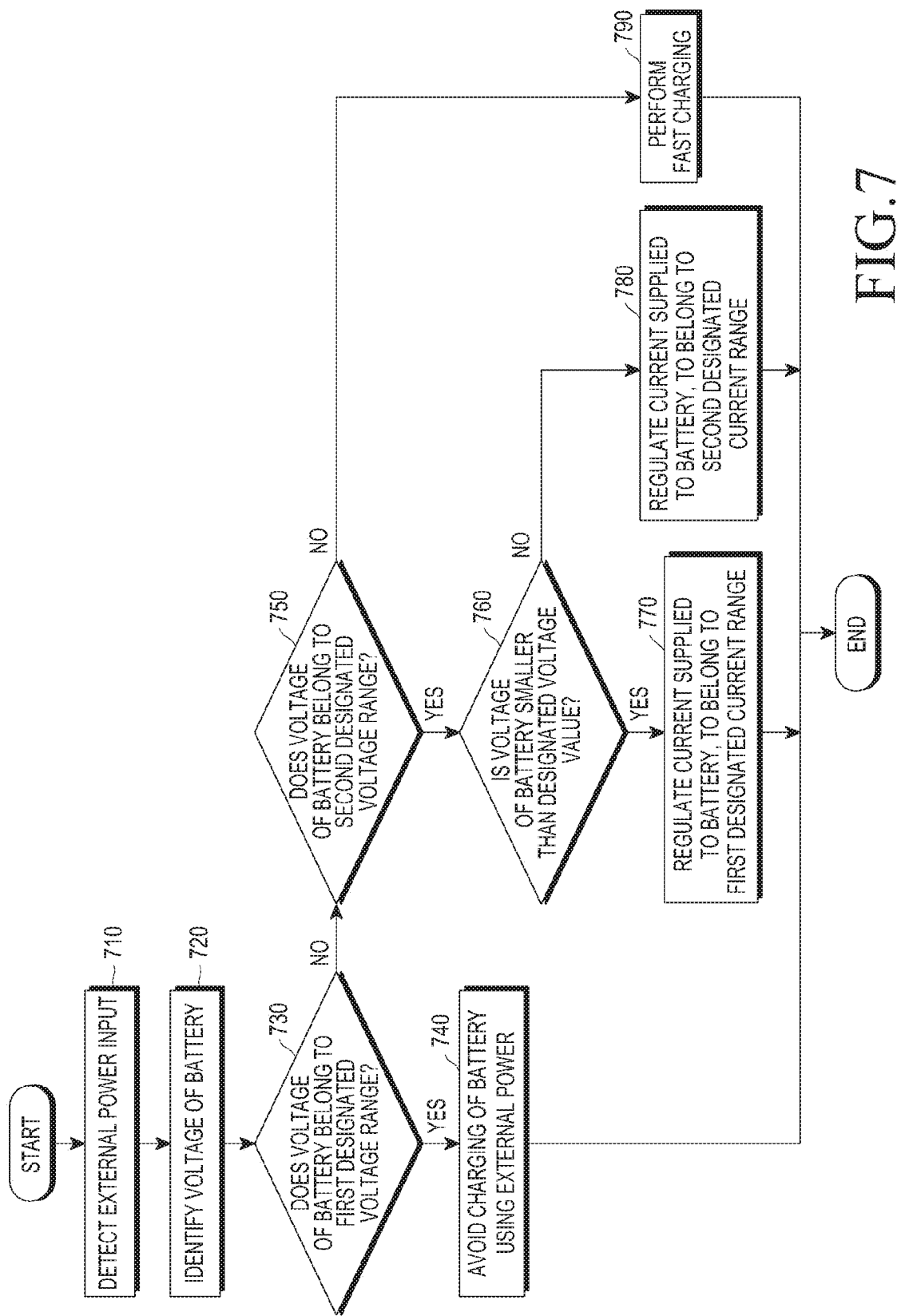
FIG. 7 is a flowchart of a method for charging a battery by an electronic device, according to an embodiment of the present disclosure.

FIG. 7 is a flowchart of a method for charging a battery by an electronic device, according to an embodiment of the present disclosure.

An operation of the power management circuit 420 of the electronic device 101 will be described in FIG. 7, but the present disclosure is not limited thereto. The processor 410 of the electronic device 101 may also perform the operation described according to FIG. 7.

In operation 710, the power management circuit 420 may detect an input of an external power. The power management circuit 420 may detect the external power input from an external electronic device connected by wire or wirelessly to the electronic device 101.

In operation 720, the power management circuit 420 may identify a voltage of the battery 430 (e.g., the battery 296) of the electronic device 101 in response to the detection of the input of the external power. The power management circuit 420 may identify a voltage of the battery 430 immediately after an input of external power is detected or after passage of a designated time interval after the input of the external power is detected. The power management circuit 420 may periodically identify the voltage of the battery 430 and may use a voltage of the battery 430 identified at a closest time based on a time point at which the power management circuit 420 detects an input of the external power.

In operation 730, the power management circuit 420 may determine whether the voltage of the battery 430 belongs to a first designated voltage range. When a voltage of the battery 430 belongs to the first designated voltage range, the battery 430 is in an over discharged state and may be damaged when being charged.

In operation 740, when the voltage of the battery 430 belongs to the first designated voltage range, the power management circuit 420 may avoid charging the battery 430 using the input external power. When the voltage of the battery 430 belongs to the first designated voltage range, the power management circuit 420 may supply the input external power to the system circuit 400 of the electronic device 101, rather than supplying the input external power to the battery 430.

In operation 750, the power management circuit 420 may determine whether the voltage of the battery 430 belongs to a second designated voltage range. When the voltage of the battery 430 belongs to the second designated voltage range, the battery 430 is in an over discharged state. However, a current supplied to the battery 430 during charging is regulated, so that damage resulting from the charging may not occur.

In operation 760, when the voltage of the battery 430 belongs to the second designated range, the power management circuit 420 may determine whether the voltage of the battery 430 is less than a designated voltage value.

According to the present disclosure, when the voltage of the battery 430 is less than the designated voltage value even when the voltage of the battery 430 belongs to the second designated voltage range, the battery 430 may be damaged by receiving a current that is used for charging the battery 430 in a state where the battery 430 has not been overdischarged. The power management circuit 420 is required to regulate a current supplied to the battery 430 in order to charge the battery 430 without damaging the battery 430.

In operation 770, when the voltage of the battery 430 is less than the designated voltage value, the power management circuit 420 may regulate a current supplied to the battery 430, to belong to a first designated current range. The power management circuit 420 may regulate a voltage of at least some of the external power, and thus can regulate a current supplied to the battery 430, to belong to the first designated current range. The power management circuit 420 may charge the battery through a current regulated to belong to the first designated current range.

In operation 780, when the voltage of the battery 430 is greater than or equal to the designated voltage value, the power management circuit 420 may regulate a current supplied to the battery 430, to belong to a second designated current range. The power management circuit 420 may regulate a voltage of at least some of the external power, and thus can regulate a current supplied to the battery 430, to belong to the second designated current range. The power management circuit 420 may charge the battery through a current regulated to belong to the second designated current range.

In operation 790, when the voltage of the battery 430 does not belong to the first and the second designated range, the power management circuit 420 may fast-charge the battery 430. The power management circuit 420 may fast-charge the battery 430 by supplying, to the battery 430, a current according to a charge protocol for fast charging.

According to the present disclosure, The power management circuit 420 may perform a wireless/wired charging discrimination, discrimination through a standard datastream port (SDP), discrimination through a charging datastream port (CDP), dedicated charging port (DCP) discrimination through backwards compatibility (BC) 1.2, fast-charging charger (e.g., a travel adaptor (TA)) discrimination through a communication, or a USB Type C discrimination through power delivery (PD) communication. The SDP is a general USB port, and may include a charge port capable of charging up to 5 V/500 mA. The CDP is a port that performs charging and USB communication simultaneously, and may include a port capable of charging up to 5 V/0.9 A. The DCP is a port that is connected to TA, and may include a port capable of charging up to 5 V/2 A. A charge power or a chargeable capacity may vary by each manufacturer.

According to the present disclosure, when a charging device is connected to the electronic device 101, the power management circuit 420 may identify a power type from a power input. For example, the power management circuit 420 may determine whether the power is input from a wireless input port or a wired input port. When it is determined that a connection port is a USB Type-C port and the power has been input through a wired input port (or the wired charging interface), the power management circuit 420 may identify whether to connect a Type-C connector, by using a configuration channel (CC) pin. When a Type-C connector is connected, the power management circuit 420 may perform USB power delivery (PD) communication through a CC pin, and thus may negotiate about charging power between the electronic device 101 and the charging device. When a connection port is not a Type-C connector, the power management circuit 420 may determine it is a conventional USB connector (e.g., a micro USB), and when it is determined that a conventional USB connector is connected, the power management circuit 420 may apply a high signal (e.g., 0.6 V) to a D+ line (at a D+ pin) to identify a feedback signal of a D− line (at a D− pin). When the D− feedback signal is in a high state (greater than or equal to 0.3 V), the power management circuit 420 may determine a CDP or a DCP device, as the connected charger. Otherwise, the power management circuit 420 may determine an SDP, as the connected charger. In order to distinguish the type of connected charger, such as CDP or DCP, the power management circuit 420 may apply a high signal (e.g., 0.6 V) to the D− line to identify a feedback signal of a D+ line. When a D+ feedback signal is in a high state (greater than or equal to 0.3 V), the power management circuit 420 may determine the connected charger is a DCP device. Otherwise, the power management circuit 420 may determine the connected charger is a CDP device.

According to the present disclosure, when the connected charger is determined to be a DCP device, the power management circuit 420 may additionally determine whether the DCP device is a general charging device or a fast charging device. In a case of a general charging device, a D+ pin and a D− pin have been short-circuited in the charging device. Therefore, when sensing the voltage of the D+ pin and the D− pin, the power management circuit 420 may always recognize an identical level of voltage. In a case of a fast charging device, the D+ pin and the D− pin have been short-circuited therein, and then are opened after a particular time passes, so that the voltages of the D+ pin and the D− pin, sensed in the electronic device, become different from each other. Based on a condition, the power management circuit 420 may determine whether the charging device is a general charging device or a fast charging device capable of performing communication. In a case of a fast charging device, the power management circuit 420 may negotiate with the charging device about charging voltage/current through packet communication using a data pin, or exchanging a promised voltage level. The power management circuit 420 may notify the processor 410 of a result obtained by determining the type of charging device, and the processor 410 may control a charge limit time according to the result. When connected to a charger, the power management circuit 420 may detect a Vbus pin, determine whether the charger is a Type-C charger, identify the type of the charger through a connection or opening of the D+ pin and the D− pin, and identify a fast or a general charger type through control of the D+ pin and D− pin.

Figure 8:
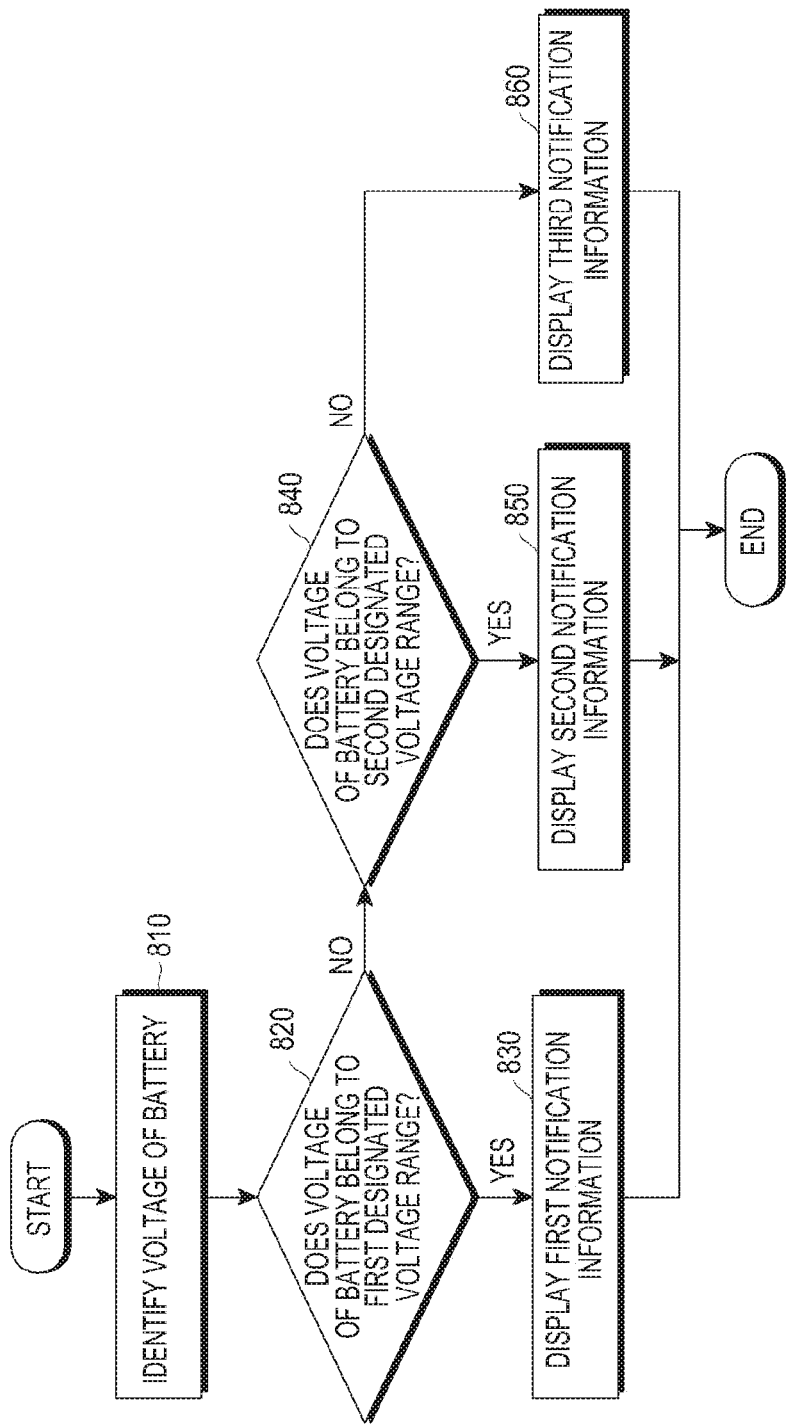
FIG. 8 is a flowchart of a method for displaying notification information indicating the state of a battery by an electronic device, according to an embodiment of the present disclosure.

FIG. 8 is a flowchart of a method for displaying notification information indicating the state of a battery by an electronic device, according to an embodiment of the present disclosure.

In operation 810, the processor 410 of the electronic device 101 may identify the voltage of the battery 430 on the basis of information on the voltage of the battery 430 of the electronic device 101 received from the power management circuit 420 of the electronic device 101.

In operation 820, the processor 410 may determine whether the voltage of the battery 430 belongs to a first designated voltage range. In order to notify a user of the state of the battery 430 in a case where the voltage of the battery 430 belongs to the first designated voltage range, the processor 410 may determine whether the voltage of the battery 430 belongs to the first designated voltage range.

In operation 830, when the voltage of the battery 430 belongs to the first designated voltage range, the processor 410 may display first notification information indicating a first state of the battery 430 through the display 440 of the electronic device 101. A first state of the battery 430 may indicate a state where the battery 430 is over discharged and a state where the battery 430 is not being charged because damage may occur if the battery 430 is charged.

According to the present disclosure, when it is identified that the voltage of the battery 430 belongs to the first designated voltage range, the processor 410 may show, through the display 440, a warning message about the battery 430 by using at least one element.

In operation 840, the processor 410 may determine whether the voltage of the battery 430 belongs to a second designated voltage range. In order to notify a user of the state of the battery 430 in a case where the voltage of the battery 430 belongs to the second designated range, the processor 410 may determine whether the voltage of the battery 430 belongs to the second designated range.

In operation 850, when the voltage of the battery 430 belongs to the second designated voltage range, the processor 410 may display second notification information indicating a second state of the battery 430 through the display 440. For example, the second state of the battery 430 may indicate a state where the battery is over discharged, but is being charged.

In operation 830 or 850, when the voltage of the battery 430 belongs to the first designated voltage range or the second designated voltage range, the processor 410 may operate the electronic device 101 in the first operation mode. In the first operation mode, the processor 410 may activate only some elements used for displaying notification information indicating the charging of the battery 430 or the state of the battery 430 among elements included in the electronic device 101. In the first operation mode, as only some of the elements are activated, a function relating to charging of the battery 430, provided from the OS operated in the electronic device 101, may not be performed. The processor 410 may not use a function relating to the charging of the battery 430 provided from the OS and may display the first notification information or the second notification information.

In operation 860, when the voltage of the battery 430 does not belong to the first designated range and the second designated range, the processor 410 may display third notification information indicating a third state of the battery 430 through the display 440. The third state of the battery 430 may indicate a state where the battery is being charged, not a state where the battery is over discharged.

According to the present disclosure, when the voltage of the battery 430 belongs to the first and the second designated range, the processor 410 may operate the electronic device 101 in a second operation mode. The processor 410, in the second operation mode, may complete booting, may activate all the elements included in the electronic device 101, and may perform all the operations which can be performed by the electronic device 101. In the second operation mode, as the booting is completed, and all the elements included in the electronic device 101 are activated, the processor 410 may perform a function relating to charging the battery 430 provided from the OS operated in the electronic device 101. The processor 410 may display the third notification information using a function relating to the charging the battery 430 provided from the OS.

Figure 9A:
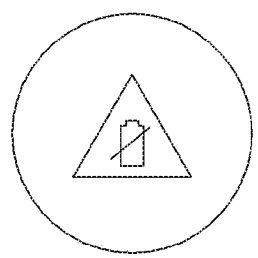
FIGS. 9A to 9C illustrate notification information indicating the state of a battery, according to embodiments of the present disclosure.
Figure 9B:
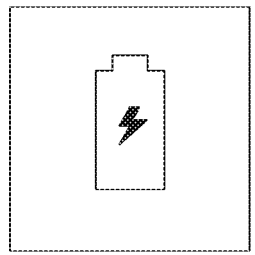
Figure 9C:
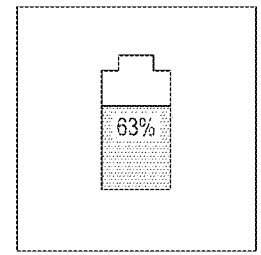

FIGS. 9A to 9C illustrate notification information indicating the state of a battery, according to embodiments of the present disclosure.

According to the present disclosure, the processor 410 (e.g., the processor 120 or 210) of the electronic device 101 may provide the state of the battery 430 to a user. The processor 410 may identify the state of the battery 430 on the basis of the identified voltage of the battery 430 and then display notification information indicating the identified state of the battery 430 through the display 440 (e.g., the display 150 or 260). The notification information may include a graphic object indicating the state of the battery 430 in order to allow a user to intuitionally recognize the notification information.

FIG. 9A illustrates first notification information indicating a first state of the battery 430. The first state of the battery 430 may indicate a state where the battery 430 is over discharged and a state where the battery 430 is not being charged because damage may occur if the battery 430 is charged.

FIG. 9B illustrates second notification information indicating a second state of the battery 430. The second state of the battery 430 may indicate a state where the battery is over discharged, but is being charged. Second notification information indicating the second state of the battery 430 may be differently displayed depending on whether the voltage of the battery 430 is less than a designated voltage value. For example, when the voltage of the battery 430 is less than the designated voltage value, an image having a first resolution may be displayed as the second notification information. When the voltage of the battery 430 is greater than or equal to the designated voltage value, an image having a second resolution higher than the first resolution may be displayed as the second notification information.

According to the present disclosure, at least one of the first notification information and the second notification information may be stored in a boot loader executed in the first operation mode of the electronic device 101, or may be loaded through at least one code included in the boot loader.

According to the present disclosure, when external power is supplied to the processor 410, a code-in bootloader for operating the processor 410 stored in an internal ROM (iROM) included in the processor 410 may be executed. The processor 410 may display the first notification information or the second notification information stored in the boot loader, or may load the first notification information or the second notification information using at least one code stored in the boot loader and then display the loaded information.

FIG. 9C illustrates third notification information indicating a third state of the battery 430. The third state of the battery 430 may indicate a state where the battery 430 is being charged, not a state where the battery 430 is over discharged. The processor 410 may display the third notification information using a function relating to the charging of the battery 430 provided from the OS.

Figure 10:
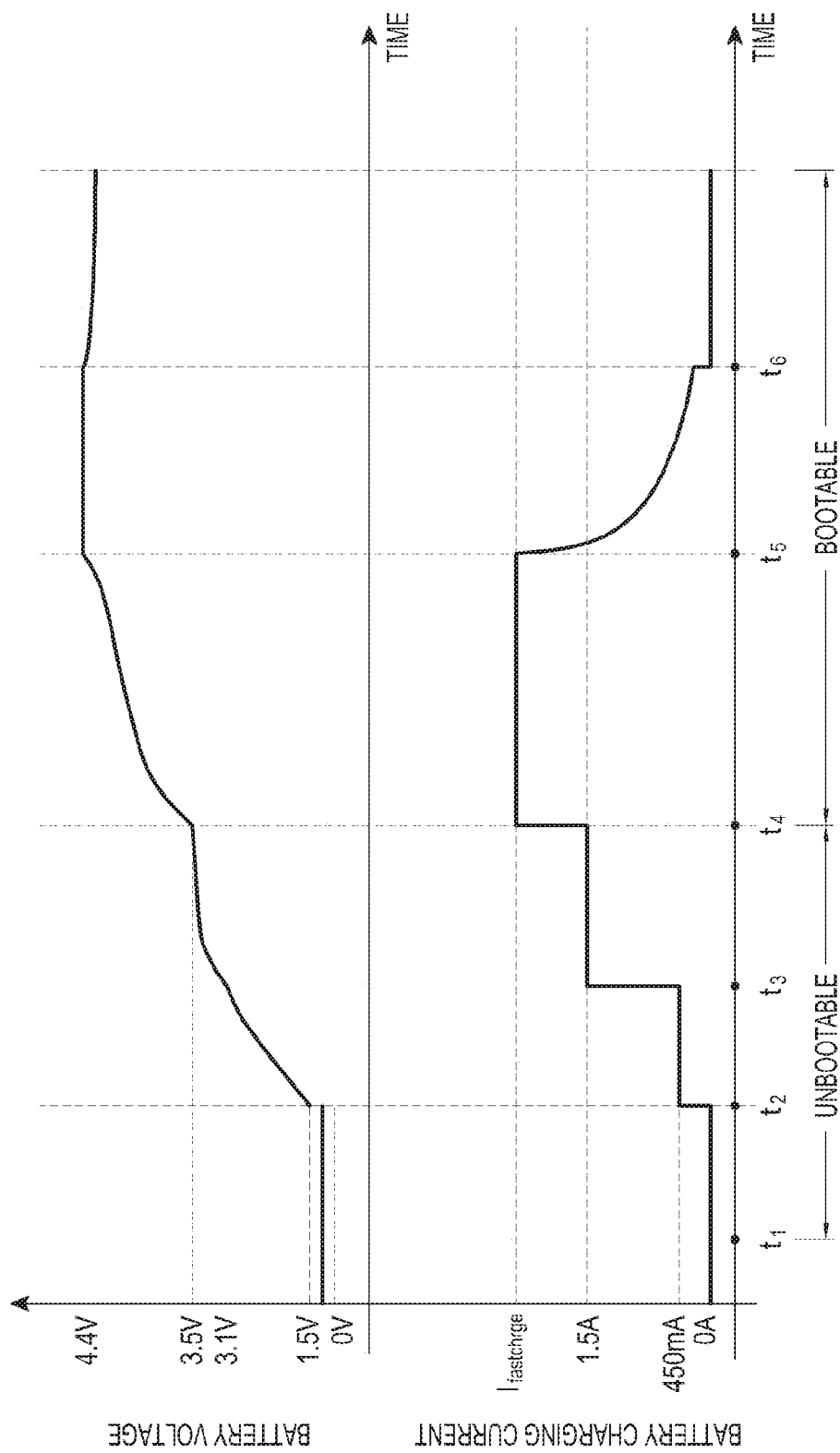
FIG. 10 is a graph showing a battery charging current and a battery voltage, according to an embodiment of the present disclosure.

FIG. 10 is a graph showing a battery charging current and a battery voltage, according to an embodiment of the present disclosure.

The power management circuit 420 (e.g., the power management module 295) or the processor 410 (e.g., the processor 120 or 210) of the electronic device 101 may identify the voltage of the battery 430 (e.g., the battery 296) in response to the detection of an input of external power.

According to the present disclosure, the power management circuit 420 or the processor 410 may determine whether to charge the battery 430 depending on the identified voltage of the battery 430.

Referring to FIG. 10, for an interval from t1 to t2, when the identified voltage of the battery 430 is less than a designated first voltage value (e.g., about 1.5 V), the power management circuit 420 or the processor 410 may determine that the voltage of the battery 430 belongs to a first designated voltage range. When the voltage of the battery 430 belongs to the first designated voltage range, the power management circuit 420 or the processor 410 may limit charging of the battery 430 in order to prevent damage to the battery 430.

According to the present disclosure, for an interval from t2 to t4, when the identified voltage of the battery 430 is greater than or equal to the first voltage value and is less than a designated second voltage value (e.g., about 3.5 V), the power management circuit 420 or the processor 410 may determine that the voltage of the battery 430 belongs to a second designated voltage range. The power management circuit 420 or the processor 410 may charge the battery 430 when the voltage of the battery 430 belongs to the second designated voltage range.

According to the present disclosure, for an interval from t2 to t3, when the identified voltage of the battery 430 belongs to the second designated voltage range and is less than a designated third voltage value (e.g., about 3.1 V), the power management circuit 420 or the processor 410 may regulate a current supplied to the battery 430 to belong to a first designated current range. The first designated current range may be designated such that a maximum current value thereof is about 450 mA.

According to the present disclosure, for an interval from t3 to t4, when the identified voltage of the battery 430 belongs to the second designated voltage range and is greater than or equal to a designated third voltage value (e.g., about 3.1 V), the power management circuit 420 or the processor 410 may regulate a current supplied to the battery 430 to belong to a second designated current range. The second designated current range may be designated to have a current value (e.g., about 1.5 A) greater than the maximum current value of the first designated current range.

According to the present disclosure, for an interval from t4 to t5, when the identified voltage of the battery 430 does not belong to the first and the second designated voltage range, the power management circuit 420 or the processor 410 may fast-charge the battery 430 by a constant current.

According to the present disclosure, for an interval from t5 to t6, when the identified voltage of the battery 430 become greater than or equal to a designated fourth voltage value (e.g., 4.4 V), the power management circuit 420 or the processor 410 may fast-charge the battery 430 by a constant voltage.

According to the present disclosure, for an interval from t1 to t4, when the identified voltage of the battery 430 belongs to the first or the second designated voltage range, the power management circuit 420 or the processor 410 may operate the electronic device 101 in a first operation mode. In the first operation mode, the power management circuit 420 or the processor 410 executes a boot loader stored in the electronic device 101, to activate only at least some of elements included in the electronic device 101 while not completing booting.

According to the present disclosure, for an interval from t4 to t6, when the identified voltage of the battery 430 does not belong to the first and the second designated voltage range, the power management circuit 420 or the processor 410 may operate the electronic device 101 in a second operation mode. In the second operation mode, the power management circuit 420 or the processor 410 may complete booting, may activate elements included in the electronic device 101, and may perform all the operations which can be performed by the electronic device 101.

According to an embodiment of the present disclosure, an electronic device may include a battery; an interface 450 that receives an external power; a system circuit including a processor; and a power management circuit, wherein the power management circuit may be configured to detect an input of the external power through the interface; identify a voltage of the battery in response to the detection of the input of the external power when the voltage of the battery belongs to a first designated voltage range, avoid charging the battery using the input external power and supply the input external power to the system circuit; and when the voltage of the battery belongs to a second designated voltage range, charge the battery using at least some of the external power.

According to an embodiment of the present disclosure, the electronic device may further include a display, wherein the processor may be configured to, when the voltage of the battery belongs to the first designated voltage range, display first notification information indicating a first state of the battery through the display; and when the voltage of the battery belongs to the second designated voltage range, display second notification information indicating a second state of the battery through the display.

According to an embodiment of the present disclosure, the power management circuit may be configured to transfer information on the voltage to the processor.

According to an embodiment of the present disclosure, the power management circuit may include at least one switch that supplies the input external power to the system circuit or the battery, and may be configured to control the at least one switch such that when the voltage of the battery belongs to the first designated voltage range, the input external power is supplied to the system circuit and the input external power is not supplied to the battery.

According to an embodiment of the present disclosure, when the voltage of the battery belongs to the second designated voltage range, the power management circuit may be configured to control the at least one switch such that at least some of the input external power is supplied to the battery.

According to an embodiment of the present disclosure, the power management circuit may be configured to, when the voltage of the battery belongs to the second designated voltage range and the voltage of the battery is less than a designated voltage value, regulate a voltage of the at least some of the input external power such that a current supplied to the battery belongs to a first designated current range; and when the voltage of the battery belongs to the second designated voltage range and the voltage of the battery is greater than or equal to the designated voltage value, regulate the voltage of the at least some of the input external power such that current supplied to the battery belongs to a second designated current range.

The power management circuit may be configured to identify the voltage of the battery after passage of a designated time interval after a current regulated to belong to the first designated current range is supplied to the battery; and when the voltage of the battery identified after passage of the designated time interval is less than the designated voltage value, stop charging the battery using the at least some of the input external power.

According to an embodiment of the present disclosure, the processor may be configured to, when the voltage of the battery belongs to the first and the second designated voltage range, operate the electronic device in a first operation mode; and when the voltage of the battery does not belong to the first and the second designated voltage range, operate the electronic device in a second operation mode.

According to an embodiment of the present disclosure, the electronic device may further include an input device that obtains a user input that converts the operation mode of the electronic device from a first operation mode to a second operation mode, wherein the processor may be configured to, when the voltage of the battery does not belong to the first and the second designated voltage range, convert the operation mode of the electronic device from the first operation mode to the second operation mode, depending on the obtained user input; and when the voltage of the battery belongs to the first or the second designated voltage range, maintain the operation mode of the electronic device to be the first operation mode even when the user input is obtained.

According to an embodiment of the present disclosure, a method for controlling charging of a battery in an electronic device may include detecting an input of an external power; identifying a voltage of the battery in response to the detection of the input of the external power; when the voltage of the battery belongs to a first designated voltage range, avoiding charging the battery using the input external power and supplying the input external power to a system circuit of the electronic device; and when the voltage of the battery belongs to a second designated range, charging the battery using at least some of the external input power.

According to an embodiment of the present disclosure, the battery charging control method may further include, when the voltage of the battery belongs to the first designated voltage range, displaying first notification information indicating a first state of the battery; and when the voltage of the battery belongs to the second designated voltage range, displaying second notification information indicating a second state of the battery.

According to an embodiment of the present disclosure, the battery charging control method may further include, when the voltage of the battery belongs to the first designated range, avoiding charging of the battery using the input external power and supplying the input external power to the system circuit of the electronic device by controlling the at least one switch of the electronic device such that the input external power is supplied to the system circuit and the input external power is not supplied to the battery.

According to an embodiment of the present disclosure, the battery charging control method may further include, when the voltage of the battery belongs to the second designated range, charging the battery using at least some of the external input power by controlling at least one switch of the electronic device such that the at least some of the input external power is supplied to the battery.

According to an embodiment of the present disclosure, the battery charging control method may further include, when the voltage of the battery belongs to the second designated range, charging the battery using at least some of the external input power, when the voltage of the battery is less than a designated voltage value, by regulating a voltage of the at least some of the external power such that current supplied to the battery belongs to a first designated current range; and when the voltage of the battery belongs to the second designated range and the voltage of the battery is equal to or greater than the designated voltage value, regulating a voltage of the at least some of the external input power such that the current supplied to the battery belongs to a second designated current range.

According to an embodiment of the present disclosure, the battery charging control method may further include identifying the voltage of the battery after passage of a designated time interval after a current regulated to belong to the first designated current range is supplied to the battery; and when the voltage of the battery identified after passage of the designated time interval is less than the designated voltage value, stopping charging the battery using the at least some of the external input power.

According to an embodiment of the present disclosure, the battery charging control method may further include, when the voltage of the battery belongs to the first or the second designated voltage range, operating the electronic device in a first operation mode; and when the voltage of the battery does not belong to the first and the second designated voltage range, operating the electronic device in a second operation mode.

According to an embodiment of the present disclosure, the battery charging control method may further include obtaining a user input that converts the operation mode of the electronic device from a first operation mode to a second operation mode; when the voltage of the battery does not belong to the first and the second designated voltage range, converting the operation mode of the electronic device from the first operation mode to the second operation mode, depending on the obtained user input; and when the voltage of the battery belongs to the first or the second designated voltage range, maintaining the operation mode of the electronic device to be the first operation mode even when the user input is obtained.

According to an embodiment of the present disclosure, a non-transitory computer-readable recording medium is provided in which a program to be performed in a computer is recorded, wherein the program comprises an executable instruction allowing a processor to, when the program is performed by the processor, detect an input of an external power; identify a voltage of the battery in response to the detection of the input of the external power; when the voltage of the battery belongs to a first designated voltage range, avoid charging the battery using the input external power and supply the input external power to a system circuit of the electronic device; and when the voltage of the battery belongs to a second designated voltage range, charge the battery using at least some of the input external power.

According to an embodiment of the present disclosure, the operation of, when the voltage belongs to the first designated range, avoiding charging of the battery using the input external power and supplying the input external power to the system circuit of the electronic device may include controlling the at least one switch of the electronic device such that the input external power is supplied to the system circuit and the input external power is not supplied to the battery.

According to an embodiment of the present disclosure, the operation of, when the voltage belongs to the second designated range, charging the battery using at least some of the external power may include, when the voltage of the battery belongs to the second designated range and the voltage of the battery is less than a designated voltage value, regulating a voltage of the at least some of the external power such that a current supplied to the battery belongs to a first designated current range; and when the voltage of the battery belongs to the second designated range and the voltage of the battery is greater than or equal to the designated voltage value, regulate the voltage of the at least some of the external power such that the current supplied to the battery belongs to a second designated current range.

Each of the elements described in the present disclosure may be configured with one or more components, and the names of the corresponding elements may vary based on a type of electronic device. Some elements may be omitted or other additional elements may be further included in the electronic device. Also, some of the elements of the electronic device may be combined into one entity, which may perform functions identical to those of the relevant elements before the combination.

At least some of devices (e.g., modules or functions thereof) or methods (e.g., operations) may be implemented by an instruction which is stored a memory 130 in the form of a program module. The instruction, when executed by a processor 120, may cause processors to execute the function corresponding to the instruction.

The computer-readable storage medium may include a hard disk, a floppy disk, a magnetic medium (e.g., a magnetic tape), an optical media (e.g., CD-ROM or DVD), a magneto-optical media (e.g., a floptical disk), or an inner memory. The instruction may include a code made by a compiler or a code that can be executed by an interpreter. The module or the programming module may include one or more of the aforementioned elements or may further include additional elements, or some of the aforementioned elements may be omitted. Operations performed by a module, a programming module, or other elements may be executed sequentially, in parallel, repeatedly, or in a heuristic manner. At least some operations may be executed according to another sequence, may be omitted, or may further include other operations.

Various embodiments of the present disclosure may provide a non-transitory computer-readable recording medium in which a program to be performed in a computer is recorded, wherein the program comprises an executable instruction allowing a processor to, when the program is performed by the processor, detect an input of an external power; identify a voltage of the battery in response to the detection of the input of the external power; when the voltage of the battery belongs to a first designated voltage range, avoid charging the battery using the input external power and supply the input external power to a system circuit of the electronic device; and when the voltage of the battery belongs to a second designated voltage range, charge the battery using at least some of the input external power.

While the present disclosure has been shown and described with reference to certain embodiments, it will be understood by those skilled in the art that various changes in form and details may be made therein without departing from the spirit and scope of the present disclosure, which is defined, not by the detailed description and embodiments, but by the appended claims and their equivalents.

What is claimed is:

1. An electronic device comprising:
   a battery;
   an interface that receives an external power;
   a system circuit including a processor; and
   a power management circuit, wherein the power management circuit is configured to:
   detect an input of the external power through the interface;
   identify a voltage of the battery in response to the detection of the input of the external power;
   when the voltage of the battery belongs to a first designated voltage range, avoid charging the battery using the input external power and supply the input external power to the system circuit, wherein a voltage belongs to the first designated voltage range when the voltage is less than a first designated voltage;
   when the voltage of the battery belongs to a second designated voltage range and is less than a designated third voltage value, charge the battery using at least some of the input external power of which current belongs to the first designated current range, wherein a voltage belongs to the second designated voltage range when the voltage is greater than or equal to the first designated voltage and less than a second designated voltage and wherein the battery is identified as being in an over-discharge state when the voltage of the battery is less than the second designated voltage;
   when the voltage of the battery belongs to the second designated voltage range and is greater than or equal to the designated third voltage value, charge the battery using at least some of the input external power of which current belongs to a second designated current range greater than the first designated current range; and
   when the voltage of the battery is greater than or equal to the second designated voltage, charge the battery using at least some of the input external power which belongs to a third designated current range greater than the second designated current range, wherein the third designated current range is in accordance with a charge protocol for fast charging.

2. The electronic device of claim 1, further comprising:
   a display,
   wherein the processor is further configured to:
   when the voltage of the battery belongs to the first designated voltage range, display first notification information indicating a first state of the battery through the display; and
   when the voltage of the battery belongs to the second designated voltage range, display second notification information indicating a second state of the battery through the display.

3. The electronic device of claim 2, wherein the power management circuit is further configured to transfer information on the voltage of the battery to the processor.

4. The electronic device of claim 1, wherein the power management circuit includes:
   at least one switch that supplies the input external power to the system circuit or the battery.

5. The electronic device of claim 1, wherein the power management circuit is further configured to:
   identify a voltage of the battery after passage of a designated time interval after a current regulated to belong to the first designated current range is supplied to the battery; and
   when the voltage of the battery identified after passage of the designated time interval is less than the designated third voltage value, stop charging the battery using the at least some of the input external power.

6. The electronic device of claim 1, wherein the processor is further configured to:
   when the voltage of the battery belongs to the first or the second designated voltage range, operate the electronic device in a first operation mode; and
   when the voltage of the battery does not belong to the first and the second designated voltage range, operate the electronic device in a second operation mode.

7. The electronic device of claim 1, further comprising:
   an input device that obtains a user input that converts an operation mode of the electronic device from a first operation mode to a second operation mode,
   wherein the processor is further configured to:
   when the voltage of the battery does not belong to the first or the second designated voltage range, convert an operation mode of the electronic device from the first operation mode to the second operation mode, depending on the obtained user input; and
   when the voltage of the battery belongs to the first or the second designated voltage range, maintain an operation mode of the electronic device to be the first operation mode even when the user input is obtained.

8. A method for controlling charging of a battery in an electronic device, the method comprising:
detecting an input of an external power;
identifying a voltage of the battery in response to the detection of the input of the external power;
supplying the input external power to a system circuit of the electronic device while avoiding charging the battery using the input external power when the voltage of the battery belongs to a first designated range, wherein a voltage belongs to the first designated voltage range when the voltage is less than a first designated voltage;
charging the battery using at least some of the input external power of which current belongs to a first designated current range when the voltage of the battery belongs to a second designated range and is less than a designated third voltage value, wherein a voltage belongs to the second designated voltage range when the voltage is greater than or equal to the first designated voltage and less than a second designated voltage and wherein the battery is identified as being in an over-discharge state when the voltage of the battery is less than the second designated voltage;
charging the battery using at least some of the input external power of which current belongs to a second designated current range greater than the first designated current range when the voltage of the battery belongs to the second designated voltage range and is greater than or equal to the designated third voltage value; and
when the voltage of the battery is greater than or equal to the second designated voltage, charging the battery using at least some of the input external power which belongs to a third designated current range greater than the second designated current range, wherein the third designated current range is in accordance with charge protocol for fast charging.

9. The method of claim 8, further comprising:
when the voltage of the battery belongs to the first designated voltage range, displaying first notification information indicating a first state of the battery; and
when the voltage of the battery belongs to the second designated voltage range, displaying second notification information indicating a second state of the battery.

10. The method of claim 8, wherein the supplying the input external power to the system circuit of the electronic device while avoiding charging the battery using the input external power when the voltage of the battery belongs to the first designated range further comprises:
controlling at least one switch of the electronic device such that the input external power is supplied to the system circuit and the input external power is not supplied to the battery.

11. The method of claim 8, wherein the charging the battery using the at least some of the input external power when the voltage of the battery belongs to the second designated range further comprises:
controlling at least one switch of the electronic device such that the at least some of the input external power is supplied to the battery.

12. The method of claim 8, further comprising:
identifying a voltage of the battery after passage of a designated time interval after a current regulated to belong to the first designated current range is supplied to the battery; and when the voltage of the battery identified after passage of the designated time interval is less than the designated third voltage value, stopping charging the battery using the at least some of the input external power.

13. The method of claim 8, further comprising:
when the voltage of the battery belongs to the first or the second designated voltage range, operating the electronic device in a first operation mode; and
when the voltage of the battery does not belong to the first or the second designated voltage range, operating the electronic device in a second operation mode.

14. The method of claim 8, further comprising:
obtaining a user input that converts an operation mode of the electronic device from a first operation mode to a second operation mode;
when the voltage of the battery does not belong to the first and the second designated voltage range, converting an operation mode of the electronic device from the first operation mode to the second operation mode, depending on the obtained user input; and
when the voltage of the battery belongs to the first or the second designated voltage range, maintaining an operation mode of the electronic device to be the first operation mode even when the user input is obtained.

15. A non-transitory computer-readable recording medium in which a program to be performed in a computer is recorded, wherein the program comprises an executable instruction allowing a processor to, when the program is performed by the processor:
detect an input of an external power;
identify a voltage of a battery in response to the detection of the input of the external power;
supply the input external power to a system circuit of the electronic device while avoiding charging the battery using the input external power when the voltage of the battery belongs to a first designated voltage range, wherein a voltage belongs to the first designated voltage range when the voltage is less than a first designated voltage;
charge the battery using at least some of the input external power of which current belongs to a first designated current range the voltage of the battery belongs to a second designated voltage range and is less than a designated third voltage value, wherein a voltage belongs to the second designated voltage range when the voltage is greater than or equal to the first designated voltage and less than the second designated voltage and wherein the battery is identified as being in an over-discharge state when the voltage of the battery is less than the second designated voltage;
charge the battery using at least some of the input external power of which current belongs to a second designated current range greater than the first designated current range when the voltage of the battery belongs to the second designated voltage range and is greater than or equal to the designated third voltage value; and
when the voltage of the battery is greater than or equal to the second designated voltage, charge the battery using at least some of the input external power which belongs to a third designated current range greater than the second designated current range, wherein the third designated current range is in accordance with charge protocol for fast charging.

16. The non-transitory computer-readable recording medium of claim 15, wherein supplying the input external power to a system circuit of the electronic device while avoiding charging the battery using the input external power when the voltage of the battery belongs to the first designated range comprises:
   controlling at least one switch of the electronic device such that the input external power is supplied to the system circuit and the input external power is not supplied to the battery.

* * * * *